United States Patent
Ogilvy

(10) Patent No.: US 7,302,683 B2
(45) Date of Patent: *Nov. 27, 2007

(54) METHOD AND APPARATUS FOR CONTROLLING COMMUNICATIONS

(75) Inventor: Ian Charles Ogilvy, Manly (AU)

(73) Assignee: CardSoft International Pty Limited, Manly NSW (AU)

( * ) Notice: Subject to any disclaimer, the term of this patent is extended or adjusted under 35 U.S.C. 154(b) by 0 days.

This patent is subject to a terminal disclaimer.

(21) Appl. No.: 11/207,771

(22) Filed: Aug. 22, 2005

(65) Prior Publication Data

US 2006/0015646 A1    Jan. 19, 2006

Related U.S. Application Data

(63) Continuation of application No. 09/381,143, filed on Oct. 22, 1999, now Pat. No. 6,934,945.

(30) Foreign Application Priority Data

Mar. 14, 1997 (AU) .................................. PO9896
Mar. 16, 1998 (WO) .................... PCT/AU98/00173

(51) Int. Cl.
G06F 17/00 (2006.01)
(52) U.S. Cl. .............................. 718/1; 703/23; 703/26; 703/27; 709/200; 709/201; 709/208; 709/219; 719/310; 719/313; 719/315; 719/316
(58) Field of Classification Search ................ 718/1; 719/310, 313, 315, 316; 703/23, 26, 27; 709/200, 201, 208, 219
See application file for complete search history.

(56) References Cited

U.S. PATENT DOCUMENTS

| 5,336,870 A | 8/1994 | Hughes et al. |
| 5,479,643 A | 12/1995 | Bhaskar |
| 5,553,291 A | 9/1996 | Tanaka et al. |
| 5,590,281 A | 12/1996 | Stevens |
| 5,708,838 A | 1/1998 | Robinson |
| 5,745,886 A | 4/1998 | Rosen |
| 5,923,884 A * | 7/1999 | Peyret et al. ................ 717/167 |
| 5,926,631 A | 7/1999 | McGarvey |

(Continued)

FOREIGN PATENT DOCUMENTS

AU    2200088    9/1988

(Continued)

OTHER PUBLICATIONS

"Smarter Smartcards," Hofland & Janowski, Feb. 1998, Byte Magazine 401S, pp. 7-10, whole document.

(Continued)

*Primary Examiner*—Phuoc Nguyen
(74) *Attorney, Agent, or Firm*—Duane Morris LLP

(57) ABSTRACT

Disclosed is a device arranged to process messages for communications, comprising a virtual machine means including a message processor means which is arranged to process messages communicated to and/or to be communicated from the device, and message processor instruction means, arranged to provide directions for operation of the message processor means. Also disclosed is a method for operating a device arranged to process messages for communications and a method of programming a device arranged to process messages for communications.

5 Claims, 12 Drawing Sheets

FIG. 1

U.S. PATENT DOCUMENTS

| | | | |
|---|---|---|---|
| 5,931,917 A | 8/1999 | Nguyen et al. | |
| 5,935,249 A | 8/1999 | Stern et al. | |
| 6,021,275 A * | 2/2000 | Horwat | 717/159 |
| 6,199,160 B1 | 3/2001 | Echensperger et al. | |
| 6,308,317 B1 | 10/2001 | Wilkinson et al. | |
| 6,934,945 B1 * | 8/2005 | Ogilvy | 718/1 |

FOREIGN PATENT DOCUMENTS

| | | |
|---|---|---|
| EP | 0456249 | 11/1991 |
| EP | 0634718 | 1/1995 |
| WO | 9212480 | 7/1992 |
| WO | 9305599 | 3/1993 |
| WO | 9410628 | 5/1994 |
| WO | 9727537 | 7/1997 |

OTHER PUBLICATIONS

"Java and the Shift to Net-Centric Computing," Hamilton, IEEE Computer, Aug. 1996, pp. 31-39, whole document especially "Java Virtual Machine," sidebar p. 32.

* cited by examiner (1) EVENT (EVENT DRIVEN STRUCTURE) 'CARDSWIPE' DETECTED BY HW DRIVERS 

(2) CALL BACK TO EVENT TABLE (IN HAL) LOOKS UP SEQUENCE OF COMMANDS FOR CARDSWIPE EVENT, FROM INDEX

⇩

(3) FUNCTION PROCESSOR CALLED UP TO COMMENCE IMPLEMENTATION OF COMMANDS FOR CARD SWIPE

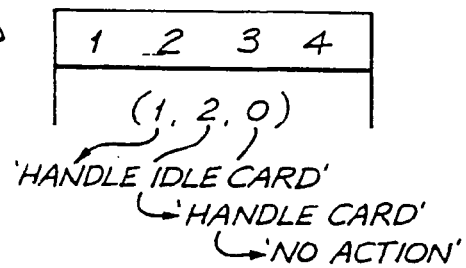

(4) SAVE INSTRUCTION IMPLEMENTED

⇩

(5) FUNCTION PROCESSOR CALLS UP MESSAGE PROCESSOR

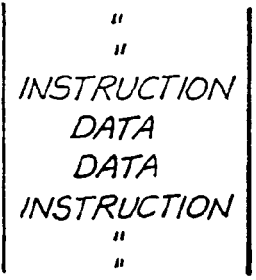

(6) FUNCTION PROCESSOR CALLS UP MESSAGE INSTRUCTION MEANS FOR CARD SWIPE EVENT

⇩

(7) MESSAGE PROCESSOR PLACES DATA FROM CARD INTO FIELDS AS DIRECTED BY MESSAGE INSTRUCTION MEANS

⇩

(8) NEXT FUNCTION/EVENT

FIG. 3

(1) EVENT.
    HAL DETECTS EVENT
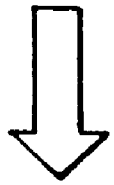
(2) HAL ACTIVATES PROTOCOL PROCESSOR
(3) PROTOCOL INSTRUCTIONS FETCHED
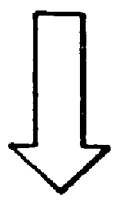
(4) PROTOCOL PROCESSOR IMPLEMENTS COMMUNICATIONS PROTOCOL IN ACCORDANCE WITH PROTOCOL INSTRUCTIONS
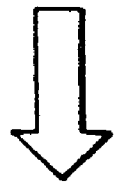
(5) NEXT FUNCTION/EVENT
FIG. 4

FIG. 8

FORMS (DISPLAY/REPORTS) MAINTENANCE

FORM NAME         #
RECEIPT          0028

─── PANEL CONTROLS ───
                 FROM PALLETE
○ ADD FIELD      | FIELD   |
CUST NAME        | FIELD   |
                 | STRING  |

○ <<DELETE>
⦿ SELECT
○ <<MARK END OF PRE-PRINT
○ MARK START OF POST-PRINT>>

○ DISPLAY
○ SECURE DISPLAY
⦿ PRINTOUT

SOFT KEYS

| DEL! | NEW! |
| <<PRIOR | NEXT>> |
| FIND# | EXIT |
| UNDO | |

MER NAME>>>>>>>>>>>>>>
ADDR LINE 1>>>>>>>>>>
ADDR LINE 2>>>>>>>>
    EODV
PAN>>>>>>>>>>>>>
CARD NAME>>  EXP D
SYS DAT    APPROV
TRANS >>>>>
FOC NUM
BASE AMT  AMOUNT>>>>
TIP/MISC.  TIP >>>>
TOTAL     TOTAL>>>>

41
71
70

METHOD AND APPARATUS FOR CONTROLLING COMMUNICATIONS

This application claims the benefit of the PCT Application No. PCT/AU98/00173, filed on Mar. 16, 1998, which is hereby incorporated by reference in its entirety. The present invention is also related to U.S. application Ser. No. 09/381,143, filed on Oct. 22, 1999, now U.S. Pat. No. 6,934,945 which is hereby by incorporated by reference in its entirety.

FIELD OF INVENTION

From a first, general aspect, the present invention relates to a method and apparatus for preparing and processing information to be sent or received via a network. A network in this instance may be implemented as data carried either over communications lines and/or stored on smart cards (or other data carriers) and physically transported.

From a second, more specific aspect, the present invention relates to a method and apparatus for controlling remote payment transactions, particularly, but not exclusively, for controlling remote payment transactions where a persons account is credited and/or debited from a remote location in exchange for goods/services cash or credit, or where account information is accessed remotely to enable approval of a transaction.

BACKGROUND OF INVENTION

Devices for carrying out remote payment transactions are well-known. These "payment terminals" include EFTPOS, credit card payment terminals, etc.

The most common function of payment terminals is to remotely access a persons account information and either carry out a transaction, such as crediting or debiting the account, or, particularly in the case of credit card payment terminals, to check the users account to ensure that there are sufficient funds to cover a transaction. Note that although credit card terminals do not necessarily remotely credit or debit the users account (the credit/debit transaction usually being carried out by a separate paper bill trail) and merely provide the information that the users account is sufficient to cover the transaction, such payment terminals still fall within the ambit of the present invention and the term "transaction" as used herein includes the operation of remotely checking the users account to "ok" a transaction.

A payment terminal may, for example, provide for the following basic operations:

(1) Input of information which is required to enable access to a customers account. The information is most often read from a magnetic stripe on a credit card or bank card or the like, or a smart card. In addition to reading details from a card a personal identification number (PIN) or the like code may also be required.

(2) Obtain access to the customers account. This is usually done by remote communication with a processing device holding the person's account data, usually on bank premises and remote from the payment terminal. Usually, information on the customers account input to the payment terminal will need to be transmitted for verification and to enable access to the account. Also a money amount will usually need to be input to the payment terminal and transmitted over the communications line. At least some and perhaps all of the transmitted data may be encrypted for security purposes and the payment terminal is therefore, in such a case, required to have means (3) providing encryption.

(4) The payment terminal may need to be able to receive communications over the remote line from the processor accessing the customers account, ie. to provide an "answer" to the payment device regarding the user transaction. The answer may include information that an account debit/credit has taken place (eg. EFTPOS) or merely an approval that the customer has enough money in his account to enable a transaction (some credit card payment terminals). Again, this transmitted information may be encrypted and, if so, will require translation (5) in the payment terminal.

(6) To provide an indication that the transaction request is approved or that a transaction has occurred, by display or printer, for example. Displays may also be required to prompt an operator or customer to input information, e.g., input your PIN "Input Amount".

There are many different brands of payment terminal, utilising many different software and hardware arrangements. This gives rise to a number of problems.

Any account acquirer (eg. bank) will generally have their own operating requirements as to how remote payment transactions will be handled. The account acquirer may purchase a series of payment terminals which have been configured by a manufacturer to the acquirer's requirements. These payment terminals will then be licensed or rented or more often supplied at no charge to merchants (e.g., retail stores, garages, restaurants). Multiple account acquirers may require access to their customers accounts via a single payment terminal. That is, one particular merchant may operate payment terminals which provide access to customers accounts at other account acquirers (e.g., other banks). Because of different requirements of different acquirers for handling of remote payment transactions, the payment terminal must be arranged to operate to satisfy the different requirements.

The terminal owner (often a principle acquirer) will have the terminal appropriately arranged and programmed by the terminal manufacturer to satisfy the requirements of all account acquirers utilising the terminal. Payment terminals may need to contain several programs and select the appropriate program depending on the card to be processed or on an operator selection.

It is often the case that the terminal owner may need to have the operation of the payment device amended to, for example, enable it to operate for an additional account acquirer, or to satisfy changed requirements for a particular account acquirer. Because of the different hardware/software architectures available, any operational alterations generally the require the input of the terminal supplier or manufacturer. The supplier/manufacturer will be required to reprogram the terminal or amend the hardware in order to carry out the alterations and they will usually be the only person who has the appropriate knowledge. The terminal owner is thus tied to the particular supplier/manufacturer of the particular brand of payment terminal.

It is often the case that, the terminal owner may over time obtain different brands from different manufacturers and for operational alterations may need to return the particular brand to each separate manufacturer. Over time, manufacturers may go out of business, in which case the payment terminals made by that particular manufacturer may be unsupported and any alteration may be difficult to achieve, or at least will require the input of a skilled person having detailed knowledge of the programming and/or hardware of the redundant manufacturer's devices.

Being tied to a particular manufacturer for a particular brand therefore causes cost, time and trouble when any operational alterations are required. There is therefore a reluctance to carry out operational alterations, which sometimes means that requirements of various account acquirers are not fully satisfied. When an operational alteration does have to be carried out, it is costly. If a manufacturer goes out of business, the terminal owner may be left with nobody to alter the operation of his payment terminals, or indeed maintain the payment terminals. The present system is costly and inflexible.

A payment terminal device usually includes a microprocessor and a number of peripheral units (e.g., card reader, display, printer, communications interface, _etc) controlled by the processor. A payment terminal device usually comprises hardware, an operating system or a BIOS and is ready to accept an application for that arrangement. Or the device may be supplied with an interpreter to accept the applications.

To alter the operation of payment terminals, a new application must be created. This can be time consuming, costly and as the programming will be different for different types of devices, which may have different hardware arrangements as well, and must be carried out separately for each different type of device (i.e., different reprogramming operations must be carried out for different devices even where the same operational alterations may be required).

The programming alterations are not "portable" between different types of devices.

The most time critical aspects of operation of a remote payment terminal involve the building up and breaking down of "messages" and the formulation and operation of communications. By "messages" is meant, for example, information data which is required to be input to the device or communicated or displayed in order to enable carrying out of a remote payment transaction, and includes information to be communicated to the bank, e.g., customers card number, customers PIN, amount of transaction, etc; displayed information such as "Please Input Amount"; information to be read from a customers magnetic stripe card or smart card and manipulated by the device e.g., card number, expiry date, etc. The operation of payment terminals is greatly concerned with the collection, rearrangement and communication of this message data to enable a remote payment transaction.

In conventional devices, each time a message is constructed or deconstructed, the operation of the machine will be handled by the application program. To change operation of the machine, the application must be changed. This is laborious, and gives rise to problems, as discussed above.

The technique of creating a _virtual processor_ (or in this case microprocessor) is well known and referred to as an interpreter. This allows programs to operate independent of processor. With the newer technique of also creating virtual peripherals then the whole is referred to as a "virtual machine".

A_virtual machine_ is computer programmed to emulate a hypothetical computer. Different incompatible computers may be programmed to emulate the same hypothetical computer. Any computer programmed to emulate the hypothetical computer will thus be capable of executing programs for the virtual computer. This creates a complete portable environment for program operations.

A problem with virtual machines is emulation is slower than normal program execution. For some applications this performance penalty is a significant problem.

The above problems and disadvantages which have been discussed specifically in relation to devices configured to process payment transactions also would apply to devices configured to prepare and process any information to be sent or received via a network, not restricted to payment transaction information.

SUMMARY OF INVENTION

A first aspect the present invention is directed to a device arranged to process messages for communications, comprising a virtual machine means including a message processor means which is arranged to process messages communicated to and/or to be communicated from the device, and message processor instruction means, arranged to provide directions for operation of the message processor means. Another aspect of the present invention is directed to a method for operating a device arranged to process messages for communications. Another aspect of the present invention is directed to a method of programming a device arranged to process messages for communications.

DETAILED DESCRIPTION OF PREFERRED EMBODIMENTS

From a first aspect the present invention provides a device arranged to process messages for communications, comprising a virtual machine means including a message processor means which is arranged to process messages communicated to and/or to be communicated from the device, and message processor instruction means, arranged to provide directions for operation of the message processor means.

"Communicated" includes transport of data via a data carrier such as a smart card.

The message processor means is preferably a program module the specific function of which is to assemble, disassemble and compare messages. By messages we mean a sequence of data comprising usually a plurality of information fields to be communicated.

The message processor means is preferably translated into the native code of the microprocessor in each hardware device on which the virtual machine is to be implemented. The message processor instructions are preferably virtual instructions to be expressed only in the language defined by the message processor means and thus never requiring translation to any real hardware processor.

The message processor means in at least a preferred embodiment provides two specific advantages over conventional arrangements 1) Faster Operation. The processor (executing as native code) operates at full microprocessor speed overcoming the problem of slow emulation speed for message related functions.

2) Faster, simpler programming. The instructions for the message processor preferably consist of actual message "descriptions". The programmer need only describe the message content, all data conversion, manipulation and processing is automatically performed based on the message description. This is a more intuitive and compartmentalised approach which preferably leads to faster programming with less errors.

The virtual machine preferably also includes a protocol processor means particularly arranged to organize communications to and from the device, and also preferably include protocol processor instructions which are arranged to provide directions for operation of the protocol processor means.

The protocol processor means is preferably a program module the specific function of which is to control and select the sequence of message processor operations in relation to messages received and transmitted.

The protocol processor means is preferably translated into the native code of the microprocessor in each hardware device on which the virtual machine is to be implemented. The protocol processor instructions are virtual instructions expressed only in the language defined by the protocol processor means and thus never requiring translation to any real hardware processor. The protocol processor means provides two specific advantages over conventional arrangements:

1) Faster Operation. The processor (executing as native code) preferably operates at full microprocessor speed overcoming the problem of slow emulation speed for protocol related functions.

2) Faster, simpler programming. The instructions for the protocol engine preferably consist of an actual diagram of the message flow. To change message flow or sequence, the programmer can modify an intuitive diagram, all multiprocessing and other complications are handled automatically. This more intuitive and compartmentalised approach leads to faster programming with less errors.

In a preferred embodiment, therefore, a device in accordance with the present invention includes a virtual machine including virtual processors which are specifically arranged to control message construction, deconstruction, comparison and to control the communication of information, both for reception from a network and transmission to a network. These operations can therefore be carried out at speed, overcoming the problems with known virtual machines and interpreters, which tend to operate slower than conventionally programmed devices. The virtual machine therefore lends itself particularly to applications relating to communications, such as payment terminal devices and other devices in which message processing and communication comprise a significant proportion of the operation of the device. In payment terminals, for example, a payment terminal including a virtual machine having the message processor means and protocol processor means can operate satisfactorily speedwise. The virtual machine can be implemented on any hardware, BIOS/OS arrangement and therefore facilitates portability of programs.

Implementation of such a virtual machine on payment terminal devices of different brands enables operation of the payment terminal devices or brands to be altered merely by altering application commands generic to all brands. Each brand is seen by the application as the same virtual machine.

The virtual machine preferably also includes a function processor means arranged to control overall virtual machine action in response to operator or other external events, and also preferably includes function processor instructions which are arranged to provide directions for operation of the function processor means.

The function processor means is preferably a program module the specific function of which is to control and select general operations of the device not specially controlled by the message and protocol processor means.

The function processor means is preferably translated into the native code of the microprocessor in each hardware device on which the virtual machine is to be implemented. The function processor instructions are preferably virtual instructions to be expressed only in the language defined by the function processor means and thus never requiring translation to any real hardware processor.

In the preferred embodiment, the "application" will therefore comprise instructions for the message, protocol and function processor means. The instructions for the function processor means may include such prior art modules as a function event scheduler and function selector.

Although the present invention is particularly applicable to application in payment terminals, it is not limited to such applications. The invention can be applied in any device where advantages are likely to be achieved for the arrangement and control of communications.

With the advent of the Internet and other extensive communications networks, it is believed that the operation of computers, such as PC's, will become more and more oriented towards acting as "servers" and/or "browsers". In other words, a major function of PC's connected to a network will be to operate either as a server, providing information and/or programs to the network for access by other parties, or as a "browser" for obtaining information/programs available on the network and operating on them. It is likely, in fact, that PC's will be asked to operate as both a server and a browser. This operation will not merely be restricted to the Internet, but for any network, even Local Area Networks.

The applicant also believes that many other classes of devices may be connected to a network. For example in the future a home video cassette recording machine could be connected to the Internet (along with other devices) allowing remote programming from a browser device. An example of the use of this would be a worker upon learning of a requirement to stay at the office late and miss a favorite show could access their home VCR from the office and program it.

Telephone calls will eventually be digital and most likely use the Internet as the digital network. Like the VCR, this does not mean all phones would need a qwerty keyboard and color display. They will both represent other classes of Internet connected devices not requiring the exact same configuration as PC's.

The present invention facilitates the production of a small, economical device which is particularly arranged to deal with communications, to build, compare and deconstruct message information. Such a device is novel maybe termed a Specialized Network Access Computer (SNAC). The applicants believe that a SNAC could emerge as a class of device allowing data entry and control through the Internet where a smaller, more economical device than a conventional PC is appropriate. In a preferred embodiment, the device is implemented utilising a virtual machine having a message processor and a protocol processor as discussed above. In the preferred embodiment, the software of the device can be considered to include three layers of virtual machine software (the HW drive layer, the Hardware Abstraction Layer, and the Virtual Machine Processor layer) and a software application. All layers other than the Virtual Machine Processor Layers are well established by prior art. A payment terminal can be used substantially without alteration as the hardware component of the device. A hardware abstraction layer (HAL) is a set of routines providing a common application program interface (API) to exercise the operating system, BIOS or hardware drivers.

HAL consists of routines to either (a) implement the functionality not provided by the underlying operating system, BIOS or hardware drivers, but needed for the common API, and (b) translation of parameters and adjustments of functionality required to adapted underlining OS, BIOS routines for the routines specified by the common API.

Such a SNAC can be applied in many different types of communication application over a network.

The present invention also facilitates the production of devices which incorporate a snac as a functional element of the device. Such devices could include both devices collecting information for transmission over a network such a pay telephones, particularly those equipped with smart card facility, or devices receiving information from a network such as the futuristic VCR or even washing machine.

Preferably, message instructions and protocol instructions may be developed on a convenient device such as a PC or general purpose computer, utilising a development tool in accordance with another aspect of the invention.

From a further aspect, the present invention provides a development tool for developing message instructions for providing directions for operation of a message processor means to be implemented in a virtual machine as discussed above, the development tool comprising a processing apparatus arranged to receive data input by a user to build message instructions for the message processor means.

The arrangement is preferably driven by a graphical user interface based program which provides various screens and fields for the user to input data relating to message instructions.

The message instructions are preferably subsequently converted to code and downloaded into the device which is to employ them with the virtual machine. From a further aspect the present invention provides a development tool for developing protocol instructions for directing operation of a protocol processor means to be implemented with the virtual machine as discussed above, the development tool comprising processing means arranged to receive data input by a user to build protocol instructions.

The arrangement is preferably a program which is arranged to build protocol instructions from the data input by the user. The program is preferably graphical user interface based and provides screens and fields to facilitate data input for the protocol instructions.

Protocol instructions and message instructions can therefore be built on a PC and downloaded to device where the virtual machine is to be implemented.

A tool has also preferably been provided for developing function processor instructions, along the lines of the tool for the protocol processor instructions and message protocol instructions.

Limited hardware provided by such a device as a payment terminal or other SNAC device does not lend itself to development and testing of applications programs. Although the finalized application must run on the hardware, to develop and test an application it is more convenient to be able to utilize a more user friendly device, such as a PC or general purpose computer.

From a further aspect, the present invention provides a communications device including a virtual machine means including a protocol processor means arranged to organize communications to and from the device and protocol processor instruction means arranged to provide directions for operation of the protocol processor means.

From a further aspect, the present invention provides means for emulating a virtual machine on a PC or other general purpose computer, the virtual machine comprising a message processing means as discussed above. The virtual machine is arranged to operate on the PC or other general purpose computer so that instructions developed for the machine can be tested.

Similar emulation is preferably provided for the protocol processor means.

Emulation can therefore be used to test payment terminal or other SNAC application programs.

The present invention further provides a method of operating a communications device, comprising the step of processing messages for communications by employing a virtual machine means including a message processor means processing messages for communication to and/or communicated from a remote device, and message instruction means providing directions for operation of the message processor means.

The method preferably also includes the steps of processing communications by employing a protocol processor means and protocol processor instructions providing directions for operation of the protocol processor means.

Message processor means, message instructions, protocol processor means and protocol instructions are preferably as discussed above in relation to previous aspects of the invention.

The present invention yet further provides a method of programming a device for processing communications, comprising the steps of loading a processing means of the processor means which is arranged to process messages communicated to and/or to be communicated from the device, and message processor instruction means arranged to provide directions for operation of the message processor means.

The method of programming preferably also includes the step of loading the processor means of the device with a protocol processor means arranged to organize communications to and from the device, and protocol processor instructions arranged to provide directions for operation of the protocol processor means.

The present invention yet further provides a computer readable memory storing code for implementing a virtual machine comprising a message processor means arranged to process messages communicated to and/or from the device.

From yet a further aspect the present invention provides a computer readable memory storing code for implementing message processor instruction means arranged to provide directions for operation of a message processor in a virtual machine means, the message processor being arranged to process messages for communication to and/or from a device.

From yet a further aspect the present invention provides a computer readable memory storing code for implementing the virtual machine including a protocol processor means arranged to organize communications to and from a device.

From yet a further aspect the present invention provides a computer readable memory storing code for implementing protocol processor instructions arranged to provide directions for operation of a protocol processor means arranged to organize communications to and from a device.

From yet a further aspect the present invention provides a specialized network access computer, including a micro processor and a virtual machine means, the virtual machine means including instructions for running on a virtual micro processor and an interface enabling the micro processor to operate the virtual processor.

Preferably the specialized network access computer is a payment terminal or other type of "card computer" (being a computer which is arranged to process information from cards and/or communicate information to cards—cards being smart cards, magnetic cards or similar).

The interface between the actual processor and the virtual processor preferably includes a hardware abstraction layer (AJL) or the like which provides a common API.

Features and advantages of the present invention will become apparent from the following description of an embodiment thereof, by way of example only, with reference to the accompanying drawings, in which:

FIG. 3 is a schematic flow diagram illustrating device operation which requires the operation of the message engine;

FIG. 4 is a schematic flow diagram illustrating an example of operation of the protocol engine;

FIG. 8 is a screen dump of a further development tool display illustrating development of a further message instruction.

An embodiment of the invention will now be described particularly with reference to a payment terminal device. The invention is not limited to payment terminal devices and the following description is given as an illustrative example only. The invention can be employed in all devices concerned with communications over a network, such as a Specialized Network Access Device.

Figure 1:
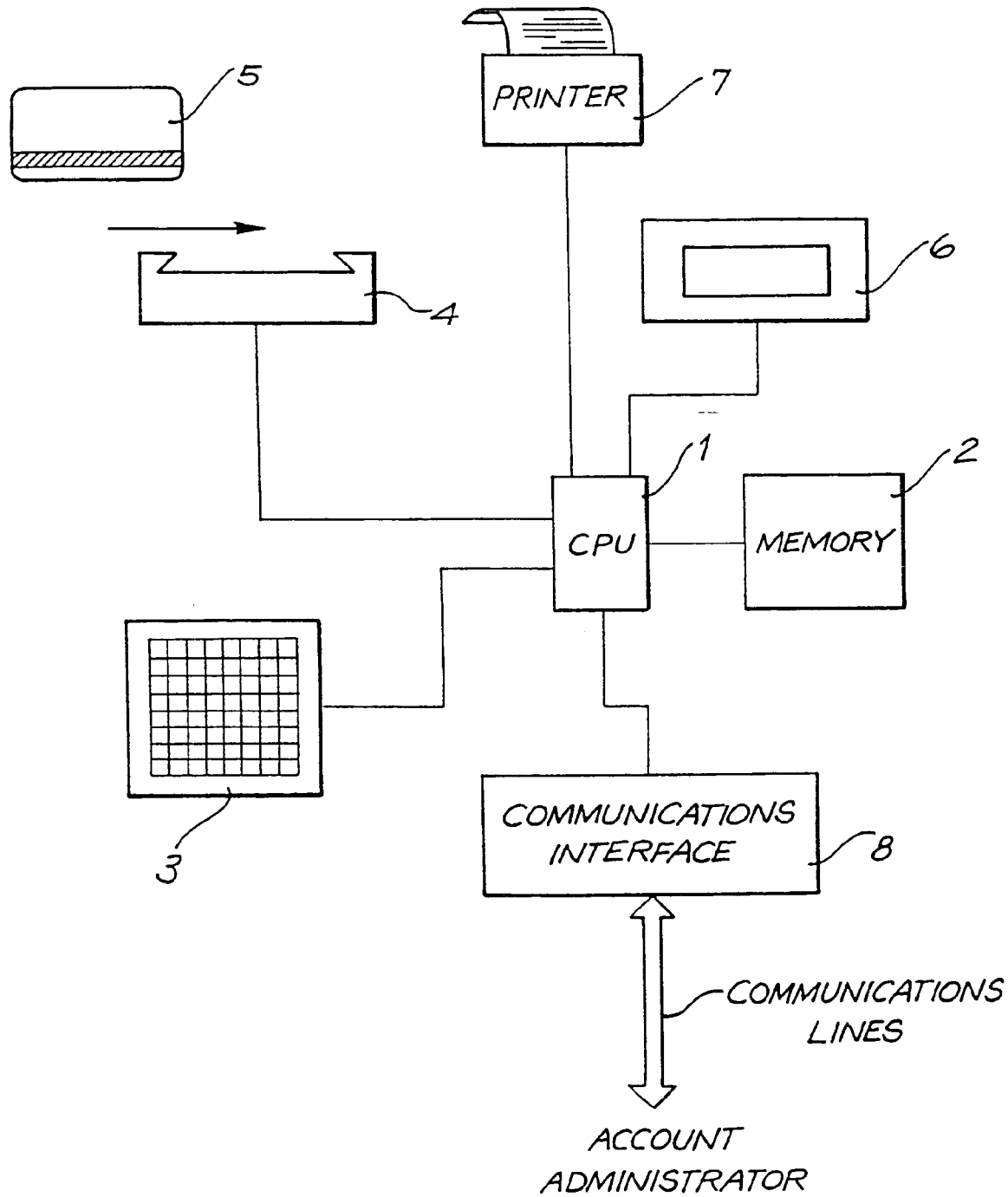
FIG. 1 is a schematic block diagram of a payment terminal in accordance with an embodiment of the present invention.

A payment terminal device in accordance with an embodiment of the present invention is illustrated in FIG. 1. The device hardware comprises a processing means which, in this embodiment includes a central processing unit 1 and a memory 2 for storing instructions and data. The device further comprises a keyboard 3 for input; a card reader for inputting information from a card 5; a display 6; a printer 7, and a communications interface 8 for communication with an account acquirer.

Prior art devices generally have similar arrangements to that illustrated in FIG. 1. The number and type of peripherals to the CPU may vary, but the essential operation required by the prior art and the present invention are similar.

Such devices operate to facilitate remote payment transactions, and a general overview of operation is as follows:

(1) Information is taken from an account holder's (customer) card 5 via a card reader 4. Transaction information is input via the keyboard 3. The transaction information may include a money amount. The display 6 may prompt the user (merchant employee, customer) to input information (e.g., it may ask a merchant employee to input an amount) and may also display information as it is input. The keyboard 3 may also be used by the customer to input a code for the account, such as a PIN number.

(2) The CPU communicates the information via communications interface 8 with an account acquirer computer. The account acquirer computer may carry out a transaction (e.g., deduct money from the customers account and pay the merchants account) or may provide an "authorization" that a transaction can be carried out. Information that an account transaction has taken place or that the account acquirer authorizes a transaction to take place is transmitted to the communications interface 8 from the account acquirer computer. A display 6 may be provided to indicate that the transaction has occurred or may proceed.

(3) When the transaction is complete, a print out of transaction information may be provided from printer 7.

Prior art payment terminal devices are generally programmed in a conventional manner. That is, programming comprises a sequential set of operating instructions which are executed in sequence to carry out a remote payment transaction. This "sequential program" may be directly compiled onto the processor of the device so that the device is under direct program control or, as is more usual, an applications program in a conventional programming language may control operations through a BIOS/OS. Whatever conventional programming form is used, however, the device suffers from the problems which are discussed in the preamble of this specification. The programs are not portable between devices having different hardware or operating system architectures and it is necessary to write a program specifically for each type of device. Further, any amendments to the operation of the device must be programmed by a programmer having knowledge of that particular device and program arrangement.

Figure 2:
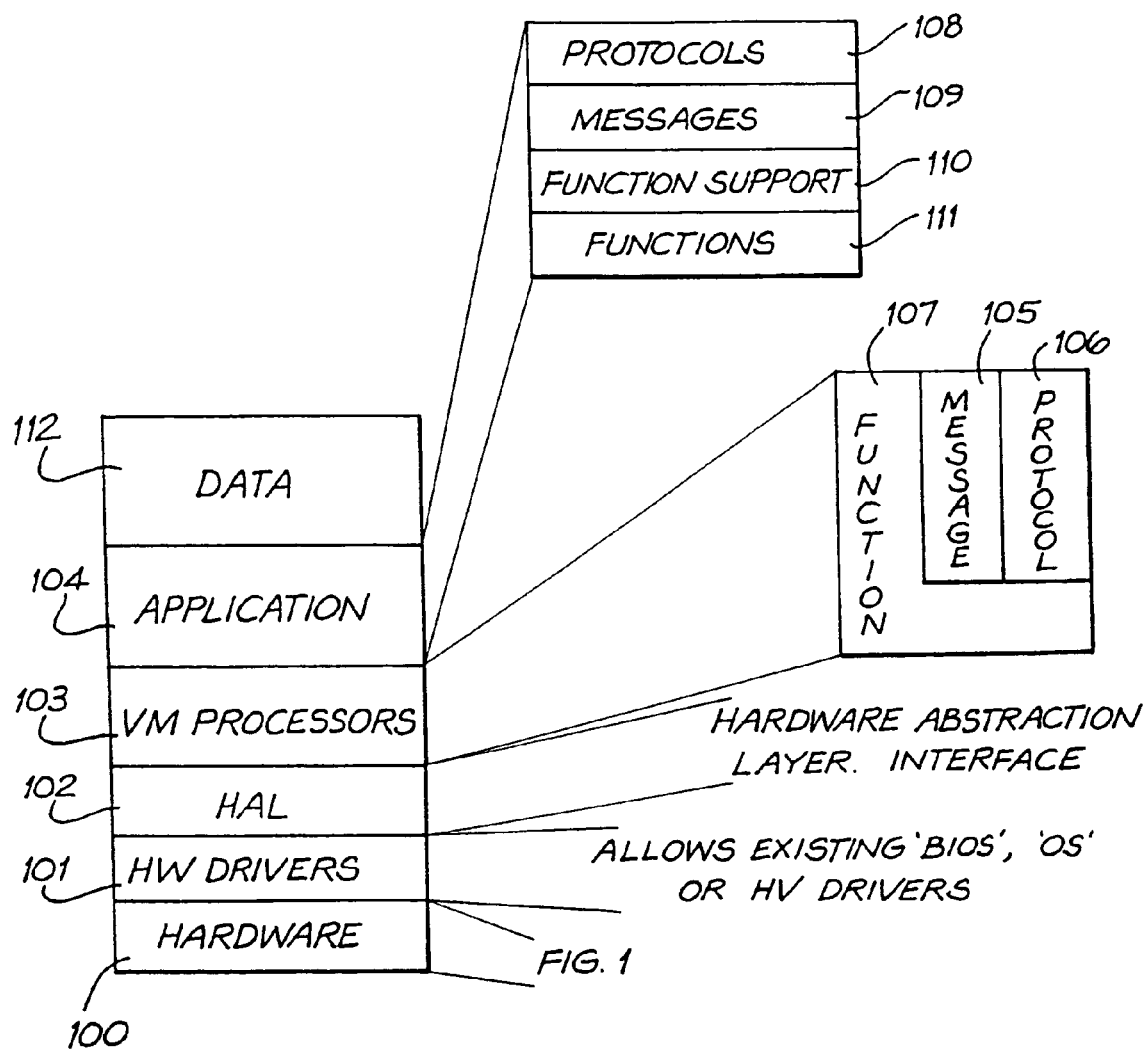
FIG. 2 is a schematic diagram of a control program architecture for the embodiment of FIG. 1.

FIG. 2 is a schematic block diagram illustrating architecture of a device in accordance with an embodiment of the present invention.

The architecture comprises the hardware 100 the device, as illustrated and described in relation to FIG. 1. It also comprises the hardware drivers, known in the prior art, and including an existing BIOS/OS or hardware drivers, reference numeral 101 and also includes the Hardware Abstraction Layer Interface (HAL) 102. The HAL 102 and hardware drivers 101 form a layer of a virtual machine which also includes virtual machine processors 103.

The virtual machine 101, 102, 103 is arranged to emulate a hypothetical payment terminal. Application 104 controls the virtual machine 101, 102, 103 which in turn controls operation of the hardware 100. The virtual machine 101, 102, 103 can be adapted for many different hardware 100 arrangements (i.e. many different brands of payment terminal). Different arrangements of hardware 100 can therefore be controlled by the same application software 104.

The provision of Hardware Abstraction Layers and hardware drivers for virtual machines is known in the prior art and fully described in various publications. Each peripheral of the virtual machine is defined to be able to act in some manner on a standard set of commands. The HAL implements the best interpretation of each command on the actual peripheral present. For example a printer is defined to implement a "feed paper ready for tear off" instruction. On differing roll paper printers this requires feeding a different number of lines, on tractor feed printers this requires feed to the next perforation.

The virtual machine processors include a message processor 105 and a protocol processor 106, implemented in software code. The message processor is arranged to process messages communicated to or to be communicated from the payment terminal via the communications interface 8. The protocol processor is arranged to organize communications to and from the device, and to control and select the sequence of message processor operations in relation to messages received and transmitted. The message processor 105 and protocol processor 106 are implemented in native code of the payment terminal and therefore operate at relatively high speed. Because much of the "work" of the payment terminal is in building, comparing and deconstructing messages and processing communications, the operation of the device is relatively quick even though employing a virtual machine, 101, 102, 103.

The virtual machine processors 103 also comprise a function processor 107 the operation of which is to control and select general operations of the device not specially controlled by the message and protocol processors 105, 106. The function processor is also preferably implemented in the native code of the microprocessor of the hardware 100. The application 104 includes protocol instructions 108, message instructions, 109, function support 110 and function instructions 111. The protocol instructions 108 govern operation of the protocol processor 106. The message instructions 109 provide directions for operation of the message processor 105. Function support 110 and function instructions 111 govern operation of the function processor 107. The application 104 and virtual machine 101, 102, 103 operate on data 112 input to the payment terminal to process it in accordance with the application 104.

In this example, the application include a set of "primitives" which are a series of symbolic commands which are executed by the device to control carrying out of a remote payment transaction. The appendix A to this specification lists primitives utilized by a preferred embodiment of the invention and gives descriptions of their respective functions. It will be appreciated, however, that a skilled person would be able to design their own primitives for carrying out remote payment transactions and the invention should therefore not be considered limited to use of the primitives listed in the appendix. It is in fact anticipated that users of the system may desired to created their own primitives and product documentation attached includes instruction for this procedure should it be desired.

Appendix A is in the form of a "HELP" file to be used with a product. The important information for the purpose of this description is the brief description of each "PRIMITIVE" and their function.

The primitives operate utilising the data 112. The data 112 may be data being input to the device, such as the customers account number, information which is fixed (strings) in the device e.g., a particular account acquirers identity.

The function processor 107 includes an event scheduler and index as known in the prior art. In response to an event (e.g., swipe card) the event scheduler operates via the index to look up a sequence of primitives 11 to be executed in response to that particular event.

In the preferred embodiment, the virtual machine processors 103 are constructed using C and the application is constructed using C++ or Java.

The device of this embodiment is event driven. When converting a device incorporation the SNAC hardware requirements to a SNAC by the provision of an appropriate HAL and virtual processors, and event driven structure can be added to a non-event driven underlying architecture through the HAL. This can be achieved through a software loop detecting events and generating an event call for any detected event.

The application 104 responds to the occurrence of an event to dictate subsequent operation of the device. For example, when a card is swiped through card reader 4, the appropriate sequence of instructions from the application 104 will be implemented. The event driven structure allows the hardware drives 101 to have control during idle periods. When an input event occurs the application is called to process the input and then returns control to the hardware drives 101.

The application may be loaded on a remote payment terminal device with a pre-existing operating system. Where the operating system is event driven HW drivers 102 can operate as an interface layer without any problems. Where the pre-existing operating system (HW drivers) is not event driven, amendments must be made via the HAL to convert to an event driven structure.

Appendix B includes a description of a operation of the HAL 18 in accordance with an embodiment of the present invention, on a functional level. A skilled person would be able to develop an appropriate HAL structure for an existing device or a new device. The appendix B is in the form of a "HELP" file for a product. It merely describes an example of implementation of a HAL and adaptation of an existing devices existing BIOS.

FIG. 3 illustrates an example of an operation of the device, for one typical step in a remote payment transaction. The other steps in the remote payment transaction are carried out in a similar way. That is, they may require the operation of the message processor 105. They are event driven, such that the application 104 is called up to deal with any particular event after the event occurs, etc.

The operation schematically outlined in FIG. 3 is that of reading information from a customers card and storing information in fields for subsequent processing by the application 105. In overall operation of the device, the information from the card will be required to identify a user and enable access to the user account to cause a transaction or authorize a transaction.

FIG. 3A illustrates example information included on a magnetic stripe on a magnetic stripe card 5. The information includes track 1 information, track 2 information, track 3 information, the customer name, the PAN, the expiry date and End-Of-Form label. This information must be taken off the card and stored in appropriately labelled fields so that it can be accessed to enable processing of the transaction.

At step (1), on a card swipe of card 5 through reader 4, the card swipe event is detected by the HW drivers 101.

The HW drivers 101 causes a call back to an event table in HAL 102 for the peripheral card reader 4 which contains a series of names for routines to be performed on the occurrence of a particular event on the card reader 4. There are also event tables for the other device peripherals.

FIG. 3B is a schematic illustration of the event table for the card reader 4. Event "2" is for card swipe. In this example, there are three alternatives available for a card swipe event, labelled "1", "2" and "3". These labels may be dynamically updated in the event table, depending upon the particular stage of operation of the device.

Label "1" is for the routine "handle idle card". This is a routine which is instigated where no payment transaction routine has yet been instigated, i.e., this is "kicking off" operation.

Label "2" is the label for the "handle card" routine. This is where the payment terminal device is waiting for a card read event, e.g., where one has a device of the type which requires a money amount to be input before the card is read.

Label "3" is where the device may be at a stage in the operation where it does not require a card reader, i.e., the card is swiped in error. In this case, nothing happens and no routine is initiated.

Note that the above descriptions of the routines are not "primitives" but are merely general descriptions.

It will be appreciated that the event table may contain labels for any number of events to carry out operation of the device peripheral the card reader 4. Similarly the other event tables for the other peripherals will be configured with labels for various routines they are required to carry out, as will be appreciated by the skilled person. It is not necessary to go into detail detailing all the routines, as they will vary from device to device and will be a matter of choice of the skilled programmer, and the operator of the payment terminal device.

This event table driven structure is ideal. In a conventional terminal, where the terminal is executing sequential program instructions, for "handle card" routine the device will merely sit in a loop waiting for a card to swipe. With this architecture, however, the device does not have to sit in a loop waiting for a card swipe. It can leave the application program and return to the HW drivers 101 and in the meantime the CPU 1 can be carrying out other jobs.

With the event label, the sequence of the application instructions for the particular routine is then looked up via an index from the application 104. The function processor 107 is then called up, step (3) to commence implementation of the instructions for card swipe. The function processor 103 then implements the instruction sequentially. The function processor 103 is a conventional interpreter, as will be understood by those skilled in the art, arranged to implement the high level primitives of the application 104 via HW drivers 101.

The first primitive requiring execution for the "handle card" routine in this example is the SAVE primitive, step (4). The first operation of the SAVE primitive is to call up the message processor 105. The message processor 105 is a series of several subroutines implemented in the native code of the CPU 1, the specific operation of which is to construct, deconstruct and compare messages in accordance with message instructions 109 from the application 104. The SAVE primitive will have associated with it a label indicating the particular message instruction 109 associated with this particular event. The function processor 107 fetches the message instruction 109 for this event and the message processor 105 then operates to load the data from the card into labelled fields (steps 5, 6 and 7) according to the message instructions.

Once the message processor 105 has loaded the information from the card into the appropriate fields, in accordance with the message instructions 109, the SAVE function is completed and the device proceeds to carry out the next function in the sequence for "card swipe" fetched by the function processor 107. Alternatively, the sequence of functions for "card swipe" may be completed and the device may wait for the next event before proceeding further.

There are a number of ways that the payment transaction could continue once the SAVE function has been carried out. For example, steps could be taken to create a display asking the customer to input a PIN. Again, such steps would be carried out by the function processor 105 implementing the instructions, which would include a function to call up the message processor 105 to build a "form" to display the request on the screen. Alternatively, the device could be controlled to take steps with regard to the information loaded into the fields by the card in accordance with the SAVE function. For example, it could compare a PAN number taken from the card with an equivalent PAN number stored in memory of the device to establish the identity of the account acquirer. A skilled person will realize that a number of possibilities are available for continuing with the transaction, and would be able to formulate appropriate programming from this description and the following appendices.

As discussed, the message virtual processor means is directed by message instructions 109.

Figure 11:
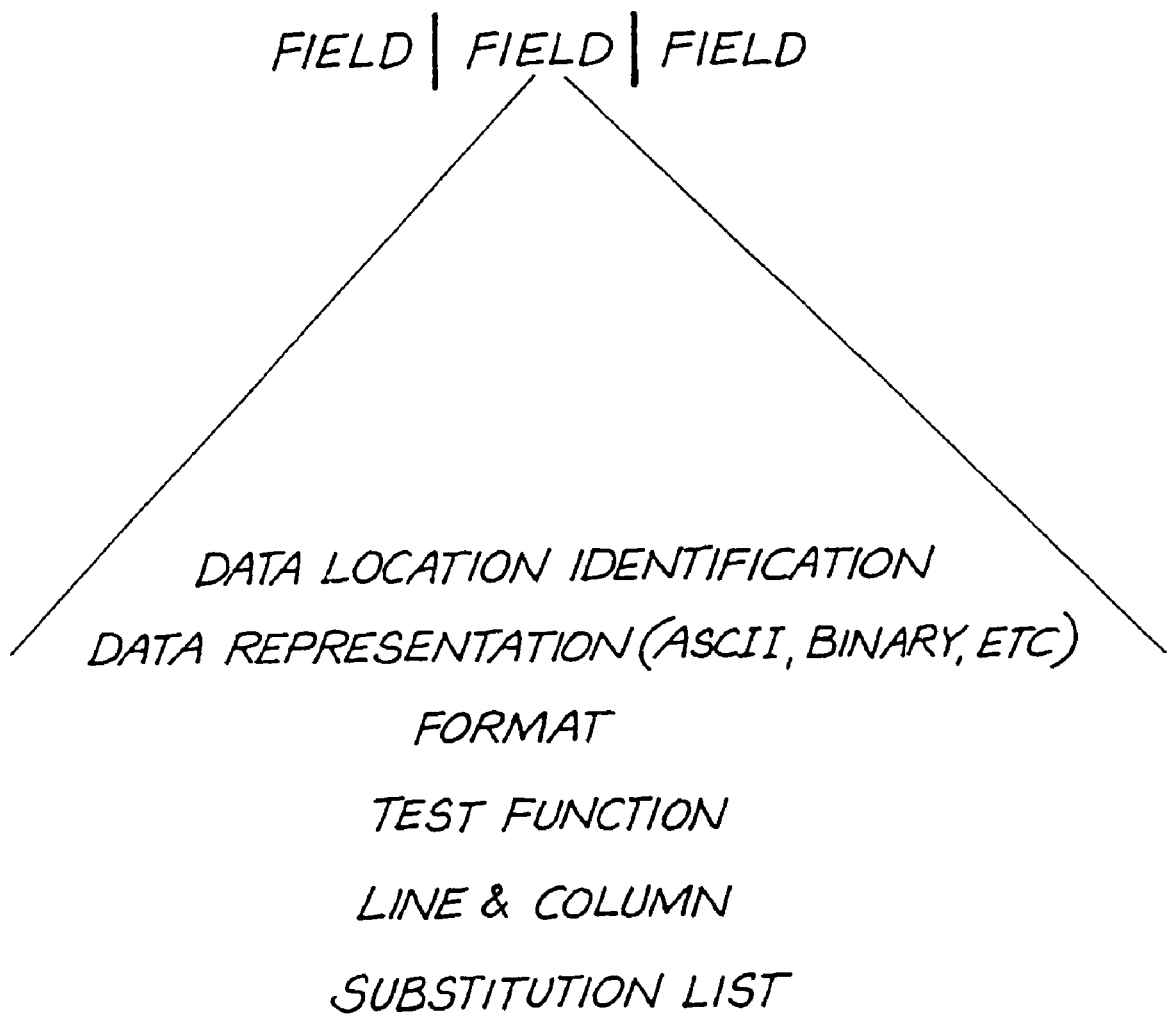
FIG. 11 is a schematic diagram showing a structural embodiment of the message instructions and description for the message processing means.

FIG. 11 is a schematic diagram illustrating the structure of the message instruction means 109. The message instruction means is in fact in the form of a set of "descriptions" of the messages. Each message usually comprises a plurality of fields 120, and the message instruction means for each message contains a corresponding plurality of message instructions. One field may be the CUSTOMER NAME, for example. In the message instruction means, each field is associated with a number of message descriptors 121 which designate characteristic to be applied to the information in that field or to be expected of the information in that field. Operations which may be carried out on the data included in that field may also be included in the descriptors 121. As illustrated in the drawing, the descriptors may include:

1. Data Location Identification. This will indicate either where the data is to be found and/or where data is to be put. In the current embodiment the data location information is contained in a two byte field descriptor (thus having 65535 different possible values) with value ranges allocated to
   1) 2000 strings
   2) literal numeric values from 0 to 32,000 in abbreviated form
   3) data field Ids where each ID is represented as an entry in a table, and each table may contain up to 256 fields.

2. Data Representation (i.e. Ascci, Binary, etc.). This indicates what representation form the data is in and/or what it is to be converted to.

3. Format. This provides a description of the format that the data is in and/or is to be placed in.

4. Test Function. The index of a function processor set of instructions to determine if the current field is to be included or excluded at this time 5. Line & Column. Relative position for use in constructing messages for display or printing. These values are used to determine the quantity of space characters, and or new line characters that are required in the buffer.

6. Substitution list. A list of text representations to substitute for numeric values e.g., display the value "1" as "Monday" and "2" as "Wednesday".

7. Additional description options as required by the application or prove useful in future embodiments.

Each message instruction will therefore include a description of a field of message data, providing instruction for the virtual message processor means which enable it to carry out a number of tasks:

1. To compare a message with a message description to see if it is the correct required message.

2. To take a message of the correct description from a location and place it in an-other location.

3. To take a message and deconstruct it into various components and place the various components into other locations.

4. To take data and build a message in accordance with the message description and place the built message in a location.

5. Compare one message with another message.

Other functions may also be carried out by the message processor as required by the application. The message processor can manipulate data in any desired way in accordance with descriptions provided by the message instructions. Messages comprising data can therefore be billed, placed in locations, taken from locations, deconstructed with elements being placed in locations, etc. for subsequent operation on the data by the application. Any device which deals with significant amounts of messages in such form can therefore benefit from this arrangement.

Each message description is labelled so that it can be identified by the application, e.g. each message description may be numerically labelled.

Figure 5:
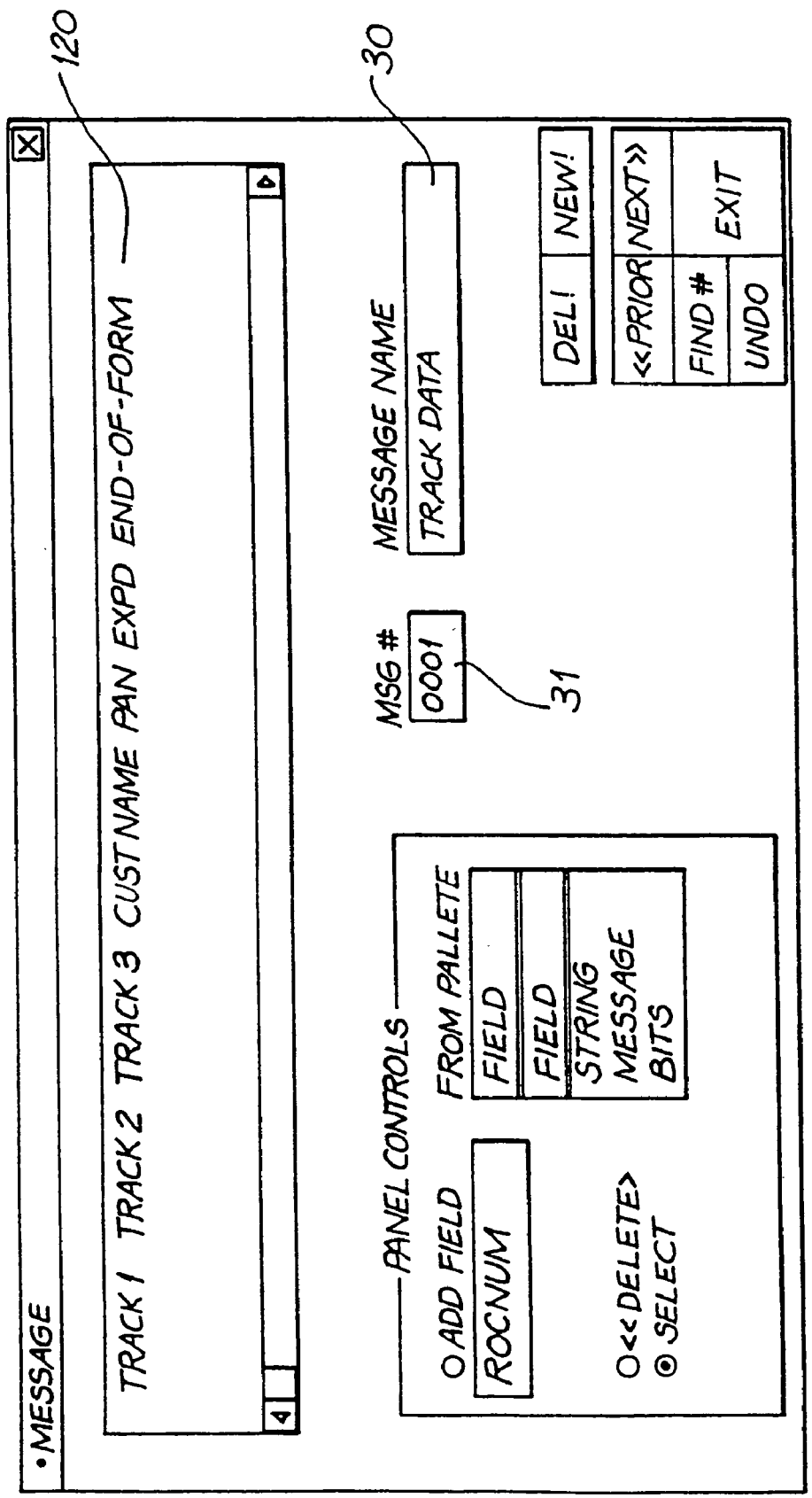
FIG. 5 is a representation of a display (screen dump) available on a development tool for developing a program for a device in accordance with an embodiment of the present invention, illustrating development of a message instruction for an example message.
Figure 6:
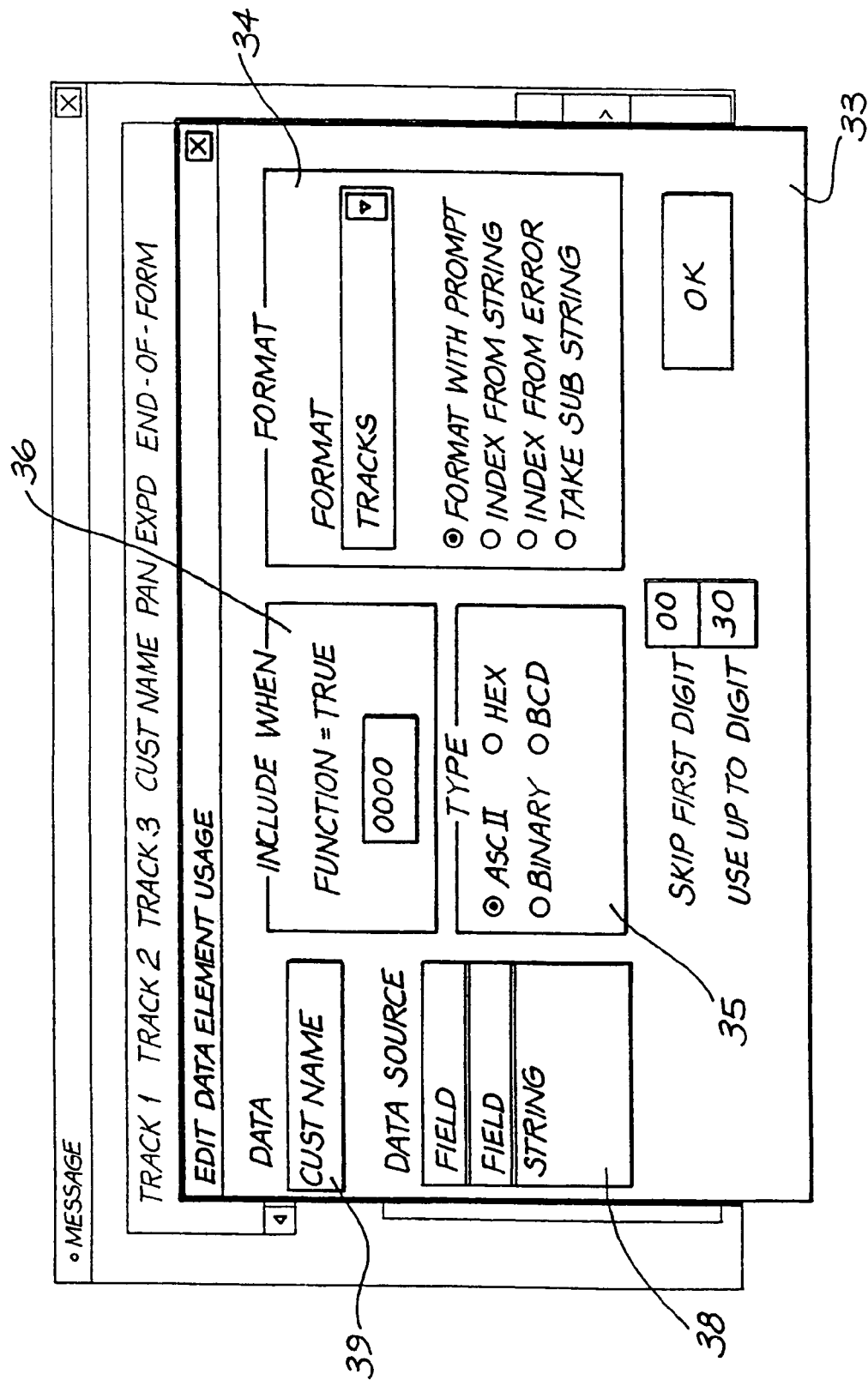
FIG. 6 is a screen dump of a further development tool display illustrating further detail of development of a message instruction.
Figure 7:
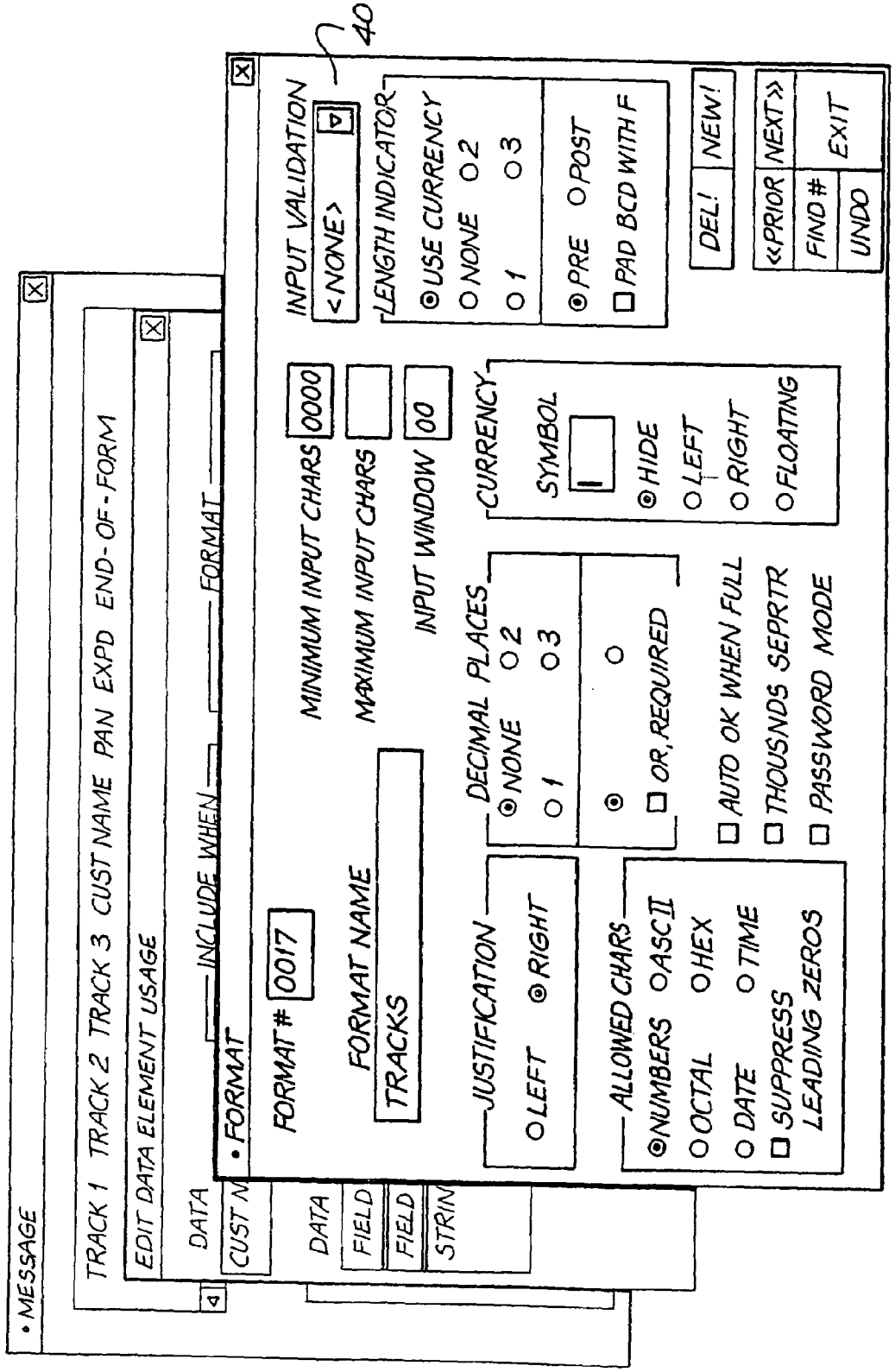
FIG. 7 is a further screen dump of a development tool display illustrating further detail of development of a message instruction.

A development tool for developing the application 104, in particular the message and protocol instructions 108, 109 comprises a graphical user interface based program which may be run on a PC or other general purpose computer. The program provides a graphical user interface based framework which enables message instructions to be built from data input by a programmer. Message instructions can subsequently be translated into code readable by the virtual machine 102, 101, 103 and downloaded into the application device. FIGS. 5, 6, and 7 are "screen dumps" which illustrate displays generated by the development tool for an example message instruction. In this case the message relates to data from a magnetic stripe of a customers card. The message instructions direct the message processor 105 to take the fields of the message and place them in known locations in accordance with the instructions. Such a message instruction may be called up in response to the SAVE primitive, in the event of a card read. Data from the magnetic stripe of the card would be stored away in the appropriate locations in accordance with the instructions, for subsequent processing.

Each message is provided with a message name 30, in this case "TrackData". This message name identifier can be used to call up this particular set of message instructions in the development tool. An alternative numeric identifier is generated for use by the virtual processor. This numeric identifier may also be displayed by the development tool. Each message is made up of a number of message "fields" 120. In this particular examples there are seven fields, being "Track1", "Track2", "Track3", "CustName", "PAN", "ExpD" and "End-Of-Form". Each of the seven field is converted to a message instruction for use by the virtual message processor. This is the information which is typically found on any magnetic stripe card. The message instructions in accordance with this embodiment direct the message processor to process these elements. Each field is associated with descriptors which provide further instructions for the handling of that element. FIG. 6 illustrates a display 33 which enables a programmer to provide message descriptors to CustName element.

Each field 120 has a "format" descriptor 34. There is an instruction as to the Data Representation ("Type") reference numeral 35. In the illustrated embodiment there are four types, Ascll, Hex, Binary and BCD. There is also a logical operation instruction (option test), reference numeral 36. This logic instruction can be used to determine whether or not the message processor will process this element at all, for example, i.e., it will only include the CustName element in the message when the logic function equals "True". Other instructions designate the data source, reference numeral 37, in this case a field, and the field label, reference numeral 39. The format 34 is labelled with a name, in this case, "Tracks". There are further instructions which dictate the format Tracks to be applied to CustName. FIG. 7 shows a display which illustrates the instructions for the format "Tracks".

The message processor is responsive to all the message instructions to load the data from the magnetic stripe card into the appropriate fields with the appropriate formats in accordance with all the rules designated in the instructions.

This embodiment of the present invention includes another class of message instruction means, known as a "Form". Instead of a Data Representation as a message descriptor, a Form includes description of a Location of the data field in the Form. FIG. 8 is a display provided by a development tool enabling the programmer to prepare message instructions for a Form message. On the left hand side of the display a panel 70 illustrates Form layout. The fields in the Form include MerName, Address Line 1, etc. The location of these fields can be moved within the panel 70. The location in the panel is provided as a descriptor and for the message instruction. The Form type of message instruction controls displays, reports, printouts, and the like. The type of Form is given by the instruction designated by reference numeral 71, in the example illustrated in FIG. 8 being a printout. The message processor takes the fields from known memory locations or other locations and enters them in the locations enabling the Form described by the Form instruction to be produced.

As discussed previously, another major function of a SNAC device is communications. For example, it is necessary for the majority of remote payment transactions for communications to be able to occur between an account acquirer location, in order to enable access to an account, and the remote payment device. Communication with a data carrier, such as a smart card device may also be required.

The protocol processor 106 is arranged to organize communications, in accordance with directions from the protocol processor instructions 108. Referring to FIG. 4, in a typical remote payment transaction, after a card has been swiped, a PIN number has been input and a charge amount has been input, information then needs to be communicated to an external computer, at the account acquirers, in order to enable further processing of the transaction. After an event such as a communications message arriving, therefore, HAL 102 detects the event (step 1) and activates the protocol processor (step 2), FIG. 4. The protocol instruction 108 for the event is rolled up (step 3). The protocol processor 108 implements the protocol instructions for that event, (step (4)).

Figure 12A:
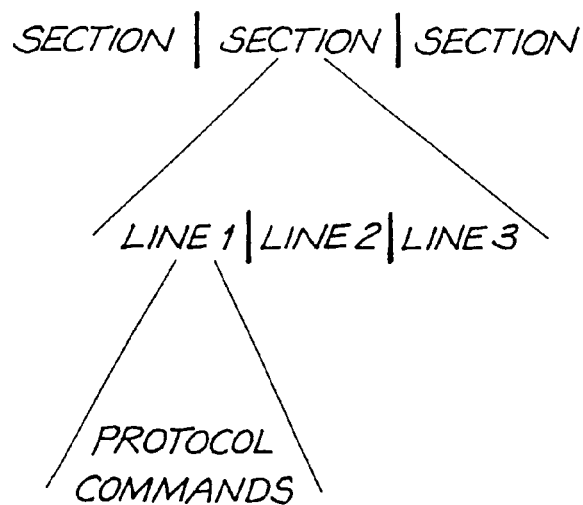
FIG. 12A is a schematic diagram showing the structure of protocol instructions for an embodiment of the protocol processor means.
Figure 12B:
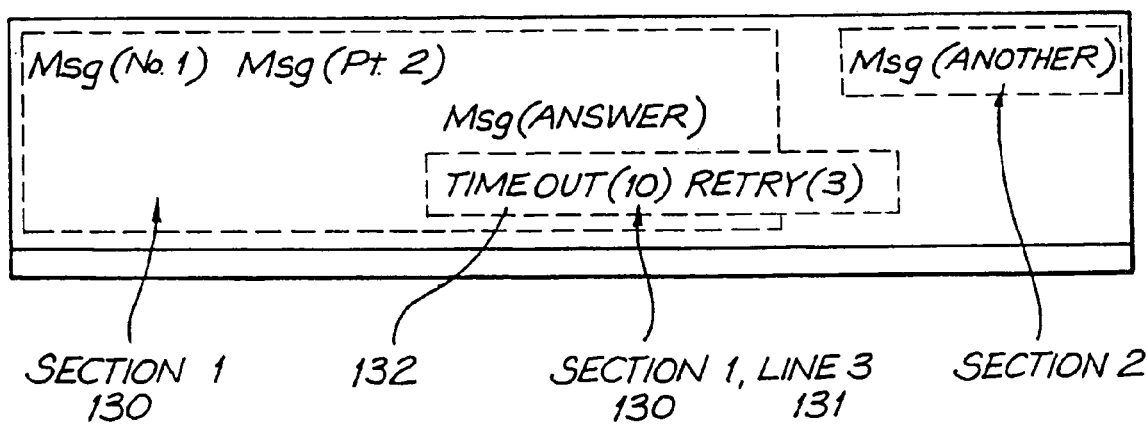
FIG. 12B is a representation of a display of a development tool for developing protocol instructions.

The protocol instructions are divided into "sections" 130, "lines" 131 and "protocol commands" 132, as illustrated in FIG. 12A. FIG. 12B illustrates how an instruction is displayed on a development tool for protocol instructions. Protocol instructions describe message flow both from and to the device. The top line specifies outgoing messages and the other lines display possible incoming results. A protocol consists of lines and sections. At the start of each section is a line 1 (optional for the first section) which describes the outgoing message. There are a number of protocol commands, and these include:

1. Protocol—Run a sub protocol
2. Message—Send a message or handle an incoming message using the virtual message processor means
3. Retry—re execute the steps of protocol from and indicated point
4. End —End of the protocol
5. Exit—Stop the protocol from an intermediate point
6. Timeout()—Specify the a delay after which the protocol should automatically jump to the point at which the timeout instruction is placed.

7. Control—Specifies a control character to be send or received.

8. Function—Execute a virtual function processor function

Protocol instructions are organized in lines and sections. In each section Line 1 indicates the information to be send by the SNAC device and subsequent lines indicate actions to be taken in response to the alternate possible events which may occur in reply. The first instruction on each of these subsequent lines is used to identify the response. Control( ), Message( ), Function and timeout( ) may all be used to identify responses as follows.

1) When the time specified by a timeout instruction elapses then the line commencing with the timeout will be selected.

2) When data is received it will be sequentially compared to a lines commencing with Control( ) Message( ) or Function to see if the data matches the control character, matches the message of causes the test contained in the function to evaluate to true.

Figure 9:
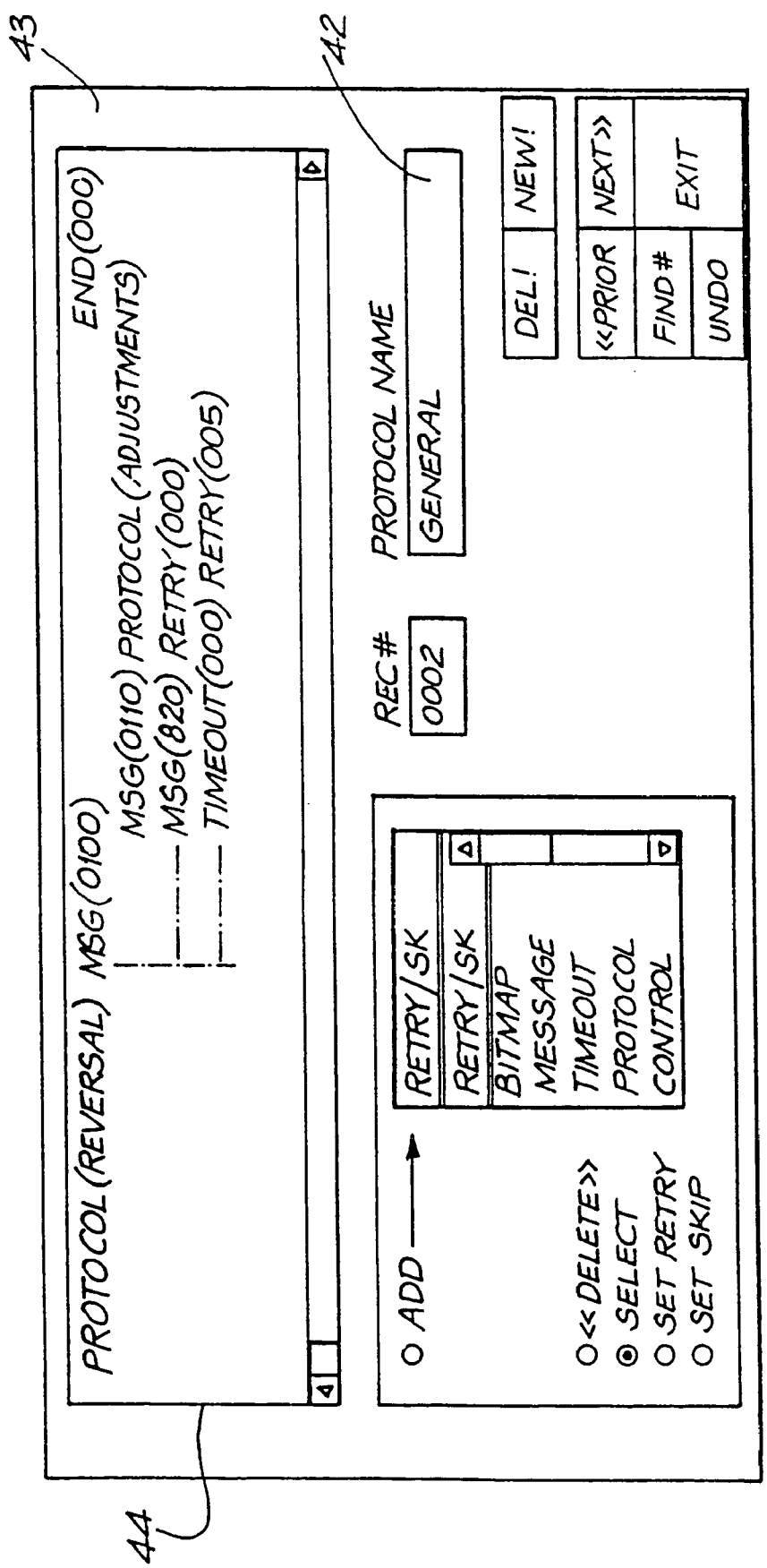
FIG. 9 is a screen dump of a further development tool display illustrating development of a protocol instruction.
Figure 10:
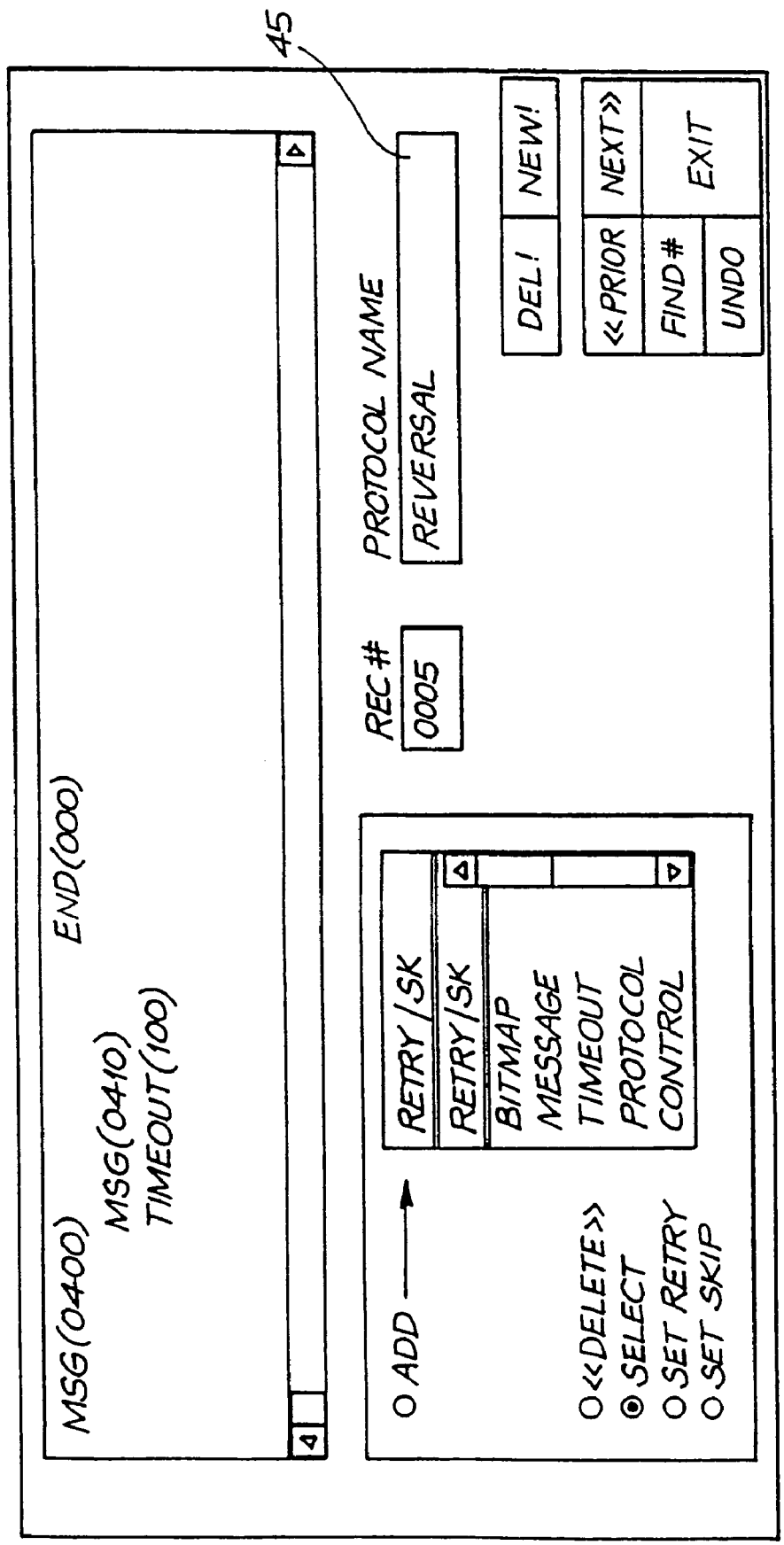
FIG. 10 is a screen dump of a further development tool display illustrates further detail of development of a protocol instruction.

FIGS. 9 and 10 illustrate displays of a development tool for protocol instructions for the protocol "General" which is the Protocol Name (reference numeral 42). Instructions are presented as a screen dump in the form of a table 43, which can be accessed by a programmer if he wishes to alter the protocol.

Protocols are arranged to control message flow both from and to the target device (e.g., account acquirer computer). The top line of the display panel 44 specifies outgoing messages and the other lines display possible incoming results.

A particular protocol is able to call up other protocols "nested" within it and is also able to call up the message engine to deal with messages.

Referring to FIG. 10, the top line of panel 44 specifies the outgoing message. The first operation of protocol "General" is to call up and carry out a further protocol, "Reversal". FIG. 11 illustrates instructions for the protocol Reversal, reference numeral 45. Reversal operates to call up the message engine to construct message number 0400 and this message is then sent to the target device.

The either

1). Message number 0410 should then be received back from the target device and the message processor will be called up to deal with that data, which involves the message processor comparing the incoming message against the description specified by the message instruction means and storing the data if a match occurs. Or 2) A timeout of 100 tenths of a second elapses.

Then the protocol is ended and re-turned to the protocol General, which causes a further message, 0100 to be formulated and sent out.

Then either

1) A message matching 0110 will be received or

2) A message matching 820 will be received or 3) neither 1 or 2 will occur for the timeout( ) period, in this case specified as 000 tenths of a second.

If the message 0110 should then be received from the target device and compared by the message engine, then another protocol "adjustments" will then be carried out. The protocol would then end.

If the message 820 should be received from the target device, which can be dealt with by the message engine and compared with the instructions from the message instruction means. The "Retry" instruction will then be executed causing the virtual protocol processor to move execution back to the sending of the (0100) message. The retry count of zero indicates this loop would continue whilst 820 messages are received.

If the Timeout occurs, then the retry(5) would be applied causing the protocol processor to move execution back to the Send 0100 message. This loop would occur up to five times as indicated by the retry(5). After the fifth time execution would move to the next section causing the protocol to End.

More details of operation and build up of messages and protocols are given in the appendix A.

The device in accordance with the present invention for example a payment terminal, may be implemented in GAVA by defining a class library payment terminals. This class library would contain calls to all the functions of how to HAL and preferably the message and protocol engines. Similarly, a specialized network access computer or card computer could be implemented in GAVA.

Please note that the arrangement of the present invention can be used to deal with any payment transaction device, including one which deals with smart cards.

The present invention can also be used to implement a specialized network access device, which may use similar hardware to that provided for a payment terminal.

In the attached Appendix A, the term "CardScript" is the name the applicants have given to programming required to implement this embodiment of the invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

APPENDIX A

Contents.

Introduction

Introduction

Help for CardScript Scribe

The Scribe program assist in the design of stored information & programs for EFTPOS terminals, PINpads, Electronic Cash Reqisters and other small computer systems.

Writing a Program

For help on writing a CardScript, program, rather than operation of the Scribe tool, see Writing a CardScript Program A CardScript program is more similar to a Windows RAD tool program than a conventional C Language or Assember program.

The "target" device has several keys, one or more card readers, and usually one or more communications ports. Defining a program consists of attaching actions to these events, or the special events of terminal power on and terminal idle.

CardScript programs—as all other program—manipulate data. Data is defined in a Data Dictionary. Unlike normal programs, it is normal to write many CardScript programs using the same Data Dictionary. Standard Data Dictionaries are available from CardSoft for EFTPOS and several other application types. It is recommended to write initial applications based on one of these standard dictionaries. Once the program is experienced, the Data Dictionary for an Application may be modified. see

Configure Data Dictionary

Data Dictionary Usage

The Data Dictionary represents the list of all "variables" or information values used in the target device. These "variables" are in formation which may change over time, or be different from device to device.

Information which is fixed for all devices usually is defined by strings. All information to be included in displays, receipts, messages etc, comes from either the Data Dictionary or from STRINGS.

Data Dictionary Fields may Have an Initial Value Set From the Initial Data Tables

Structure

Tables

The Data Dictionary is divided into tables. Each record displayed in Configure Data Dictionary describes one table. Fields are placed by selecting add and clicking on the Panel.

Field Attributes

Double Clicking on any field reveals and allows viewing and/or editing of Data Dictionary Field Attributes.

Field Order

Layouts are stored indexing fields by table#1field#. This means existing scripts will behave strangely if the Data Dictionary is changes the number Of referenced fields.

For example if "Merchant Name" is table 3/field 2 and "Address" is table 3/field 3. Then deleting field is table3/field1 will make any prior references "Merchant Name" now reference "Address". This can be remedied by inserting a dummy table3/field 1 as a placeholder. Generally this problem does not arise since new dictionaries are not to be used for old applications, and existing dictionaries are usually only extend. In the rare event that a dictionary used by existing applications is to have fields deleted, it recommended to rename them to "dummy" or "unused". Be careful since any existing data in the files will be rearranged when retrieved, it will simply be move from the record into the fields in the order listed at the time. New fields added in graphic display mode are always added at the end

Reserved Settings

See Reserved Data Dictionary Settings

See Also

Data Dictionary Field Attributes

The field attributes which may be set are as follows

Type

Type refers to the format in which data is held. "X-Ref" is a special value used to indicate that another table will be referenced at run time and thus must be included in the build.

Binary Data Fields

Binary, either 1 or 2 bytes in length for Integer values in calculations, longer fields hold bit fields or keys. 250 bytes is the maximum permissible number of bytes

Maximum Integer Values

Depending on the number of bytes used to represent the Binary number, the following values are possible

| 1 Byte | — | 0 . . . | 255 |
| 2 Byte | — | 0 . . . | 65,535 |
| 3 Byte | — | 0 . . . | 16,777,215 |
| 4 Byte | — | 0 . . . | 4,294,967,295 |

Text-up to 250 bytes

BCD up to 250 bytes

Date/Time (2 Bytes for Dates, 2 or 3 bytes for Time)

see Date & Time Fields

Amount—10 bytes, internal format is target device dependent

Packed Amount—not currently used

X-Ref—Advanced use only

Flags

0=Field is fixed and never reset

1=Reserved for future use

2=Reserved—used with deleted fields

3=Field is reset when terminal is loaded

4=Field is reset at power on

5=Field is reset by idle function

Bytes
The leright of stored data in bytes

Length
Caution: When you create new data dictionary fields, make sure their leright is not zero if you want to use them, or they will be invisible.

The number of characters allocated to display the field as text

Name
The name of the field for display on receipts etc.

Table
The "refer" Initial Data File from which the field initial value is extracted. Blank if the field is extracted from the default file.

Table ldx
When "Table" is non-blank, "Table ldx" specifies the "refer" of the Initial Data Field in the default file used to indicate the record number in "Table" from which data is to be extracted. In other words the join field between the default table and the joined table.

Field
The "refer" of the Initial Data Field from which the initial value of the field is to be obtained.

Creating a New Application

As suggested above to create any application, it is recommended to copy a "template" application. Simply copy the entire template directory.

To then work with the new directory, select File/Installation and edit the data directory. (Don't forget the trailing I) Is the recommended to exit Scribe and restart. Scribe and restart.

Console/Display

The display console used with CardScript is quite sophisticated. see

The Console
   CardScript can be used in a variety of devices, some of which may not support all the features described here.

Features
   The CardScript Console has a number of sophisticated features

Hot Keys
   Keys used to launch only one action, where the action is part of the application, are known as hot keys. Typically the action may be activated only when the terminal is idle. For further information see the "KeyBd" primitive.
   In an EFTPOS application, on a terminal with Keyboard Buttons available for allocation, Hot Keys will normally be allocated to such functions as "Sale", "Adjustment", "End of Day" etc.
   Hot keys normally would have their label printed on the keyboard, or on the physical button.

Multiple Field Input
   On any Layout displayed on the console, several field may be selected for input. The OK key steps from one input to the next. Any soft key terminates all input.

Scrolling
   The display may be scrolled, permitting a larger virtual display than the physical display. Scrolling is performed automatically by the driver in the target device. All that is needed to enable scrolling is to tell the scrolling driver what keys on the keyboard perform scrolling. The keys used to scroll are set by the Console Primitive Console(Command,Parameter)
   The command determines which of the following console options is set.
      Command I—Set Scroll Keys
   The Parameter is a string of four hex values, in order key-left, key-right, key-up, key-down
   The keyvalues specified are assigned to the scrolling engine within the target device. Note scrolling my not function on all CardScript "targets" and the size of the scrollable area may vary.
      Command 2—Set Keymap
   The parameter is a Key board map. This command is now the preferred method for setting the keyboard map. The old Keymap primitive will be obsolete in a future version. See KeyMap Structure of Keymaps
   The "field" or String used as a keymap must be a list of 4digit hex blocks, the first two digits of each block representing the hex code of the key to be mapped and the next two digits representing the hex value to map be returned. Usually used from the startup function, using a field from the terminal groups record.
   Note that the following key codes have special meaning.

08

Represents a backspace or 'CLR' code.

OA

Represents an 'OK' or 'Enter'

1B

Represents a cancel.

30 through 39

Represent the digits "0123456789"

Command 3-Keybd
   The parameter is evaluated to zero, or non zero.
   Upon entering idle state, the action of the keyboard is determined by the last KeyBd command. The keyboard (except cancel) will be ignored if off was specified.
   This command replaces the old keybd primitive, which will be obsolete in a future version.

Command 4—Invalid Entry
   The parameter is the text message to be displayed.
   This command is designed to be called from an input validation function. Calling this command indicates the input is invalid, the text specialized in the parameter should be display to indicate the error.

Soft Keys
   Some keyboard buttons on a target device may be used as soft keys. As opposed to Hot Keys these are buttons which may be used to initiate different actions, depending on the display present when they are pressed.
   Since the principle of Soft Keys is to use the same buttons for different actions, displays must in some way indicate to the user the operation of each currently active soft key.

Soft Key Button Sets
   Target devices may allocate certain buttons on the keyboard for use as soft keys. Button sets are numbered from zero. If a specified set is not available, then set zero is used. By convention:—
      Set 0 keys 'O' thru '9' (the numeric keys)
      Set 1 are dedicated soft keys, usually positioned directly adjacent to the display, in order that the display may be easily used to indicate their function.
      Set 3 is the new standard for dedicated soft keys—hex values 81,82 . . . AO.
      Set 3 will normally be requested on forms where numeric/text input is also required.
      Set 4 is the same as set 3, but allowing use of the numeric keys if no dedicated soft keys are available. Set 4 should not be specified on screens where numeric input is also available, since this may cause a conflict.

Soft Key Action Groups
   These are the groups of actions that may be offered at any given time.
   In Layouts/Forms, a soft key action set may be selected for any display. Individual functions may be assigned to an action group from the Function/General Purpose Functions, in the Function activation section.
   Note Action group 0 is used to indicate a function is NOT part of any group Correlation of Actions to Buttons
   If a display allows soft key Button Set 0, (Keys '0','1', '2','3' etc) and action set '1' then when the '2' key is pressed, then soft key group '1', An Group '2' (Key '2'minus the first key in the action set equals 2), if it exists, will be activated.

The Keyboard
   To control the features available, and make best use of your terminal, you can recode the keys on your keyboard using the keymap primitive. This allows you to customize the target device to allow portable and easy to operate applications.

See

Keyboard Codes
   The Keyboard codes are designed to accommodate a wide variety of keyboard configurations. At any given time each key (or button) will act as one of the following key types 1 Control/Data Entry Control 2 Data Entry 3 Soft/Hot key function activation Control/Data Entry Control Some keys are required for control. Control keys should not be used for any other purpose than control, otherwise the user interface will incredibly confusing.

Minimum Requirements

All CardScript drivers should provide these key codes without any mapping required.

08 Backspace or Clr

1B Cancel

0A OK or Enter

1A Fn—For general Function selection, and for double (or tripple) zero.

Additional Options 0D or complete form (combined with tab as an alternative to 0A)

09 Tab (move to next field—does not complete form)

0B Vertical Tab—Used as back tab or move to prior field.

11 (XON)DC1—Used as cursor left

12 DC2—Used as cursor right

13 DC3—Dedicated double zero

14 DC4—Dedicated Function Key (combined with DC3 as an alternative to 1 A).

Data Entry

Three levels of data entry may be available at any one time. Text, Hex, Alpha. The bios can automatically determine the available level and act accordingly.

Minimum Requirements

30..39 (Numerics)

Additional Options

A B C D E F (allowing Hex data entry)

Full 'querty' keyboard

Soft & Hot keys

Soft keys previously were recommended to be 'a"b-c' etc Now the are recommended to be hex 81 82 83 etc up to a maximum of A0 allowing up to 32 dedicated Soft keys. The change in recommended values is to allow for terminals with full alphabetic keyboards. Hot Keys (When/Additional to soft keys) should be allocated from A1 . . . D0

Program Portability

Portable Programs

CardScript allows the writing of totally portable programs, it is also possible to write programs that are not very portable. Any CardScript program will "execute" on any CardScript enabled target, however the result could be of no use on the target if special hardware characteristics are required for practical operation of the program. CardScript provides a mechanism for avoiding the traps and keeping programs portable whilst still taking advantage of special hardware when available.

Keyboard Traps

The key map primitive represents a trap in that this function should never be used with a literal string, or your program won't be portable.

Processing Cards

Magnetic Cards

Automatic Processing

Automatic Magnetic Card Processing, from

Upon Card read, data from the card is placed in the Receive buffer. The format in the buffer is Track 1 (l terminated)

Track 2 (l terminated)

Track 3 (l terminated)

Customer Name (l terminated)

PAN (l terminated)

Expiry Date (6 bytes ASCII)

If the read occurred at terminal idle, the Calculation Result is set to zero and the system event Magnetic Card Read is generated. After executing any function for the Magnetic Card Read Event, if the Calculation Result is non zero this value is used to select a function for further processing of the specific card type.

Automatic Magnetic Card Processing

Upon card swipe, the data dictionary fields

Transaction/Track2 tru Transaction/Customer

Name are filled with the card details. These are data dictionary fields Table1/Field2 thru Table1/Field7. see Reserved Data Dictionary Settings for details.

Table 5 is then scanned to find a column matching the PAN of the swiped card. If a column in table 5 is found then the tables 3 & 4 have their columns set according to the entries for Issuer & Acquirer in Table 5.

Table 5 is set during the build to indicate the appropriate action should a card be swiped at idle. If the terminal was idle at the card swipe this function is now executed.

Typical Processing.

For standard processing, create a function as follows store (0, CardMsg)

if ColFind(Pan,PanLow,PanHigh)

ColSelect(Issuer, IssuTbl)

ColSelect(Aquirer,AcqTbi)

Exit(0,CardFunc)

Smart Cards

Two primitives are available for controlling Smart Cards.

Card(Command,Field/Value)

1A command of 1 is used to read the smart card status into the field "FieldNalue". Using a value for "FieldNalue" does achieves nothing.

2A command of 2 is used to control the power to the card. If "FieldNalue" is 1, the card is powered on, if "FieldNalue" is 0 the card is powered off.

3Select. A command of 3 is used to select which smart card reader(or plug in is currently selected. By convention, 1 is the user card(or if only one reader is present, this reader), 2 is the separate merchant card slot or the plug in, where present. "FieldNalue" contains the card number to be selected.

4A command of 4 is used to read the Smart Card Type Code 5A code of 5 performs a logical test on smart card type. If the field/value supplied matches the Smart Card Type Code of the current code, the logical true flag is set. This command is designed to be used in an "if" test 6Code 6 reads the CardEntryMode into the specified FieldNalue. See CardEntryMode 7Set Card entry mode to the value specified in FieldNalue see Also TPDU(Command, SendMsg,RxMsg,Status)

The TPDU primitive is used to send a command to the card. If the TxMsg is present this data is also sent to the card. If the RxMsg is present then a response is expected from the card and is stored in the RxMsg buffer.

Command

This if the actual 5 bytes TPDU to be send to the card

SendMsg

This optional parameter specifies the message used to build the data send to the card.

RxMsg

This optional parameter specifies message used to store any data returned by the card in response to the TPDU.

Status

This mandatory message specifies the location of status variables to record the status of the TPDU operation.

The TPDU primitive with Synchronous (Memory Cards) 416 Cards

Drivers for 416 Cards support the following TPDU Commands

ReadBytes

WriteBytes

EraseBytes

Present Key see Commands for Memory Cards

The present Key uses the length indicator to select either the CardSecret Code (2 bytes) or the application erase secret code (4 bytes)

Answer to Reset, & Card Type

The 416 has a card type code of 4 and an an wet to reset of

3Bh 00 00 00 00 00

Commands For Memory Cards

ReadBytes

CL (any)

INS BO

ADDR XXXX (Byte Address an Card)

LN LL Number of bytes to read.

WfiteBytes

CL (any)

INS DO

ADDR XXXX (Byte Address an Card)

LN LL Number of bytes to write.

EraseBytes

CL (any)

INS DE

ADDR XXXX (Byte Address on Card)

LN LL Number of bytes to erase.

PresentKey

CL (any)

INS 20

ADDR XXXX (Byte Address on Card)

LN LL Length of Key.

Other Smart Card Commands

For selecting the smart card reader, and control of the reader.

For sending information to the card, and receiving information from the card.

Smart Card Type Codes

1 Async ISO type Card

2416

Asynchronous SCHLUMBERGER type EE2K

Asynchronous SCHLUMBERGER type EE4K.

Asynchronous SCHILUMBERGER type EE16K.

Asynchronous type GPM256

Asynchronous generic type 12C BUS

Asynchronous type GFM2K 9 synchronous type GFIVl4K

For coding of smart card types.

Running A CardScript Program

To run the program on the PC simulator, see

PC Simulator

There is a implementation of the CardScript Virtual machine available on the PC that not only runs your program, it also emulates the keyboard layout and other controls of any target machine.

To run the simulator—select "Build/Run Simulation of Build"

Stored Information—Data Tables

For Information on setting & changing values in the Data Tables See—

Tables Menu

CardScript includes all tools for maintaining data tables to control the setup and distribution of Data Tables required for any application.

The System Data Table

The system data table has a fixed format identical in all systems. This table contains general information and current setting for use within the scribe program.

See—

System Table Settings

Settings in the system table are used to both miscellaneous settings in the script, and options for viewing the script.

Loader Settings

Terminal For Mask Load

Not used by scribe

Default Prompt (or String) Table
The string table displayed within Scribe. Multiple string tables may be used to support multi language applications.

Peripherals
Description the peripherals of a the target system here and displays and receipts will in scribe will show guides to assist in design. These setting have no affect on program execution in target devices and may be changed at any time.

Reserved Functions

Idle State
Set this pointer to indicate a function to be executed each time the "target" becomes idle.

Abort
Normally left at <none> since applications may vary default options during execution.

Initial
This function is executed at "target" power on.

Processor
Previously used to indicate the byte order used in the "target". It is now recommended to use "Low-High (INTEL)" for all systems.

Configurable Data Tables
The data tables used by CardScript can have their names, field names, layout and even the number of tables used altered according to the current system setup.

Configure Initial Data

Initial Data Usage
The purpose of initial data tables is to provide a database of information for initial values for the data dictionary loaded into the target device.

Configuration

Structure
Each record in the configuration describes one table. Fields are placed on the Panel and dragged to the appropriate position.

Field Attributes
Double Clicking on any field reveals and allows viewing and/or editing of Initial Data Field Attributes.

Field Order
Clicking on "Graphic Display" toggles between the standard graphic view of the fields and a simple ordered list of the fields. In the ordered list mode fields may be dragged to rearrange the field order.
Be careful since any existing data in the files will be rearranged when retrieved, it will simply be move from the record into the files in the order listed at the time. New fields added in graphic display mode are always added at the end.

Reserved Initial Database Settings
Certain fields must be present in the for the build process.

File Usage

File 1—"Terminals". The name may be changed however this file is used to initialize individual target devices with the optional "NetMgr" module. No other special usage at present File 2 "Groups"—no special considerations File 3 "Issuers" no special considerations File 4 "Acquirers" no special considerations File 5 "Card Ranges"—must be used as card ranges, and must have fields "lo" "hi" and "len"

File 6 "Products" no special considerations

File 7 "Region Settings" no special considerations

File 8 "Issuer Sets" no special considerations

File 9 "Card Sets" must contain the fields "cards" as an index into card ranges see also Initial Data Field Attributes Type Flags Current usage 0=Place label to Left I=Place label above Repeat
The number of times the field is to appear on the form X-Pos
The current value of X-position of the field on the form. Usually modified by dragging the field.

Y-pos
The current value of Y-position of the field on the form. Usually modified by dragging the field.

Label
The label to appear for the field on screen.

Refer
The "refer" label used to access the field when building the initial data dictionary Display (Type=Text only) The number of characters to be displayed on screen. 0 (zero) for default.

Size

Functions
For information on defining functions in your application see—

Functions Menu see also Function Primitives
For Describing any function within the "target" to the system, or in program terms for writing scripts see General Purpose Functions
Use this selection for describing functions Label
The function name Description
A brief description of the function. The function can be located by description Action
A window to the function actions. Double click on this window to see or edit the full Function Action. see also Function Primitives & Function Primitive Categories. see Function Action Double clicking on a function action block brings a panel into view for editing the function actions.

Adding Actions

Select the appropriate action from the alphabetical list beside the add option, select add and then click on the panel at the appropriate position. Clicking over an existing action will insert the new action before the existing action Deleting, Actions Select delete and click on the action. Take care to deselect delete before clicking on other actions.

Editing Actions

Double Click on any action to activate the edit dialog box.

Function Index

Shown for reference purposes. Cannot be changed.

Strings

See your driver information. Currently this information is not used by most drivers.

Function Activation

Specifies when this function will be executed. see

Starting A Function

Function Number

Each function may be assigned a number. The operator may then enter the number and the program easily select from the list using the Function# primitive.

Hot Key Code

Each function may be assigned a hot key code. Enter a non-zero code in HEX and if a key with this code is pressed at idle, or any other time hot keys are activated, the function will be activated. Note that the Cancel Key is regarded as as system event.

System Events

System Events are similar to hot keys, only instead of keys being pressed (Note that the Cancel key, IS a system event), other actions on the target device are involved. For each target machine a list of System events is maintained, but these should always include the standard events. Only one function may be assigned to any System Event.

See

Standard Event Codes

Keyboard.

Keys on the keyboard with a value less than 128 (O×8O hexadecimal) generate an event code with the value of the key.

Other Event Codes

0=Reserved

1 System becomes Idle

2Cancel Key Pressed

3System Power On

4Numberic Entry

5Smart Card Insertion

6Smart Card Extraction

7Magnetic Card Swiped

8Checksum Error Detected on Batch

9Checksum Error Detected on Data

Card Set

Select a card set. When any card belonging to this set is swiped at idle, the function will be activated.

Usage Flags

Operator Function—The operator of the target device selects the function

Library Function—The function is an internal "subroutine"

Not Used—The function is not used

For adding actions to functions which may be varied by issuer or by acquirer see Transaction Function Input Transaction Function Approval Function Primitive Categories.

Function script is a sequence of calls to system and user primitives. For information ol primitives available see Function Primitives Assignment Primitive Field1:=String/FfeW Set field1 to the string/field2.

=> (goes to) primitive

=> field

The value of the last logical or other operation using the "calculation result" is stored in field specified eg Account ==000

=> zAccount

Would set the field zAccount to 1 if Account was zero, othersize zAccount would be zero.

=> result (goes to) primitive

=> field

The value of the last logical or other operation using the "calculation result" is stored in field specified eg Account ==000

=> zAccount

Would set the field zAccount to 1 if Account was zero, othersize zAccount would be zero.

see also

Calculation Result.

Calculations generate a "Calculation Result". Think of this value as the value you would see on the display of a calculator if the calculation was performed on a calculator.

Math Primitives

Field1+=Number/Field2

Field1−=Number/Field2

Field1*=Number/Field2

Field1/=Number/Field2

Field1 is modified by thefield2/number.

Relational Primitives

Field1value1<Field/value2

Field1value1>Field/value2

Field1value1==Field/value2

The two fields or values are compared. If one field is text and the other numeric then the return value will always be false.

<> !=>=<=

For not equals (whether thought of as<> or!=), greater than or equals (>=) and less than or equals (<=) use the opposite case. With the WHILE PRIMITIVE and REPEAT UNTIL primitive then use the NOT option. With the IF PRIMITIVE use the ELSE clause.

Abort Primitive abort

This primitive causes the target device to stop all functions and become idle

Alarm Primitive

Alarm (noise type)
Makes the sound specified 1 error alarm

2bip type noise

3most severe alarm

Bit Manipulation

Bit Numbering

All binary fields can be accessed as a number of bits where the number of bits no.of.bytes*8

The MSB of each byte has the highest bit number and the LSB the lowest bit number. Note ISO bitmaps do NOT follow this rule, but these do not need bit manipulation by the application.

This result in the LSB of the last byte being bit 0 (zero) and the MSB of the first byte being no.of.bytes*8-1. Eg for two bytes 15.

Bitcount Primitive bitcount(field,start,end,bitvalue)

start & end

These are both bit numbers. see bitnumbering. Direction of counting is from start to end, either may be the larger number.

bitvalue 0 indicates count zeros

1 Indicates count ones

2 Indicates counts zeros and stop at the first non zero bit

3 Indicates count ones and stop at the first bit no set to one.

Notes

The number of sequential bits of the value "bitvalue" starting from bit "start" and working towards "end" is counted.

If the result is non-zero the logical true status is set, otherwise the logical false value is set, allowing "if" type tests of the result The count is stored as the "working value" allowing storage via the "->" (goes to) primitive. see -> (goes to) primitive Setbits Primitive Setbits(field,startbit,endbit,value)

Bits number "start bit" thru "endbit" are set to the value "value". No all values are extracted from the least significant bits of value.e.g. For a 1 bit field, all values are considered either 1 or 0. (Odd numbers are 1)

Batch Primitive

Batch (Operation)

Operation 0=reset to first txn in batch

Operation 1=find & restore next txn

Operation 2=delete current transaction

Operation 3=delete all transactions

CardRead Primitive

Card (string, field form, default)

This primitive is identical in operation to the show primitive, with three extra facilities 1input is terminated by either the introduction of a smart card, or the swiping of a magnetic card.

2Data from a magnetic card read is stored in the reserved fields

3If the (card entry mode) is non zero, this primitive does nothing. This allows logic to read a card only if the card is not already read.

See also

EXAMPLE

A function requiring input of both "Tip Amount" and "Cash Out Amount" can input both using the same field.

Create a form as follows. Edit the PFIELD to indicate an input field.

PSTRING Name: Form
PFIELD
Create a function
Show(Tip, TipAmt, Form, 0)
Show(Cash, CashAmt, Form, 0)

Where "Tip" and "Cash" are strings. On the first call to show the display will prompt "Tip" and accept input into the TipAmt field. On the second call to Show the display will prompt "Cash" and accept input into the CashAmt field.

Show (string, field form, default)

Action

This primitive is specialized for displaying input forms. Two parameters (string and field) substitute with PSTRING and PFIELD in forms, allowing the same form to be used for multiple inputs.

String

String to replace the PSTRING field on the form. <none> if unused.

Field

Field to replace the PFIELD field on the for.

Form

The Form may be selected from the list box- or alternatively by selecting Field->Value[X] taken from a field in the data base.

Default

A value of one (1) if the existing value of the field is to be displayed as a default, otherwise 0.

Reserved Data Dictionary Settings

The driver in the "target" makes direct use of some fields in the data dictionary. Using these table#/field# settings for other use will have strange results and is not recommended.

Table 1 (Transaction Table)

Fields in this table may be initialized to default values only. The first fields in the transaction table are reserved for (in order)

1 ROCNUM

2 Track 2

3 Track 1

4 Track 3

5 SPAN

6 Expiry Date

7 Customer Name

8 Protocol Status

9 Card Entry Mode

Table 2 (Totals Table)

No reserved settings, however a fixed ten copies are available. Initialization of fields to default values only.

Table 3 (Terminal Table)

This table is the basis of the build of terminal groups, and may be initialized from the Initial Data Table. There is always only one record in the table.

Table 4 (Issuer Table)

One record per issuer, with the current record selected automatically when a card is swiped.

Table 5 (Acquirer Table)

One record per acquirer, with the current record selected automatically when a card is swiped.

Table 6 (Card Table)

Fixed layout, Dictionary specification currently ignored.

Coffind Primitive

ColFind(value,LowField,HighField)

Both LowField and HighField must be in the same table. This table is scanned for a column with the value 'value' between the two fields. The primfive is normally used to locate the CardTable Column for a card. The result variable is set to 0 if no match is found, or 1 if a match is found.

ColSelect Primitive

ColSelect(Column, Table, Reset)

Selects the relevant column of the table indicated.

Column

The column to use. The transaction table has only one column, the totals table has ten. The other tables (issuers, acquirers etc have one column for each record in the corresponding initialization data base Table For comparability, 0 (zero) selects the totals table. The tables are as follows 1 Transaction 2 Totals 3 Issuers 4 Acquirers 5 Card Ranges Reset If reset is 1 then all fields in the column are reset.

CommStat Primitive

CommState(port, value, field)

port indicates the port to be tested value indicates a value to compare and set the status accordingly.

field (optional) indicates a field to store ComsState Value. This function reads the state of the port store the value in field (if specified) and sets the current function result status to true if the value matches "value".

Date Primitive

Date(commdnd, date-field, time-field)

1 Read system date into date field and time field

2 Set system date from date field and time field see also

Dates and Times

Dates & Times are special data types both are stored as special numbers.

Date Fields

A Date field is a two byte number, representing a date since 1 Jan. 1940 to 1 Jan. 2110. Subtracting two dates reveals the number of days between the dates, dividing by 7 reveals the day of the week (Monday =O,Tuesday=1 etc).

When moving to or from a text field a date is converted to a text format of DDMMYY. If a format is used this may be converted to DD/MM/YY by using a currency symbol of/in the format. The text format of a date may be either 6 or 8 bytes long—showing the year as 2 or 4 digits.

Date Fields only contain valid dates. Since every date is stored as a day number, the storing the string 32/01/1980 will give is the actual date 01/01/1980. If data is entered directly into date fields, then dates are corrected in this manner automatically. If you wish to check the was entered correctly, then enter the data to a text field, then move the value to the date and check it is equal to the string.

e.g

Repeat
  Print(GetDdte,O)
  ActualDate:=TextDate
Until ActualDate==TextDate

The above example will continue to ask for a date until a valid date is entered.

Time Fields

Time fields may be either two or three bytes representing either the time of day to 2 seconds (two bytes) or $1/100$ of a second (three bytes) accuracy.

Moving a time to a 2 byte integer gives the number of two second periods elapsed this day. Moving to a 1 byte integer extracts the $1/100$s second fraction (up to 199) Moving to a value or larger integer extracts the total number of tics ($1/100$s sec) which have occurred prior to the time.

Moving a time to of from a text field results in either HHMIVISSFF when moving to a 8 or more byte field and HHMMSS when moving to/from a six byte field.

This text value may be formatted with a format to give HH:MM:SS.FF

Moving values between data and time fields and other numeric types results occurs without conversion. Moving to and from text values results in conversion. See specific entries for conversion details Dial Primitive Dial (phone numberphone number)

The numbers specified must be fields. Immediately following each number field in the data dictionary must be a timeout field then a retry field and then a mode field. The upstream prot is implied.

Do Primitive

Do (Function)

also known as

DoFunc(Function)

This primitive is used to activate another script function as a subroutine call

Event Primitive

Event(Function,system event)

Sets the specified function to be activated whenever the event occurs

Exit Primitive

Exit(Now?, Value)

This primitive is used to set the return value of the current function, and optionally, exit immediately.

The 'Value' is stored in the Calculation Result, which will be regarded by any calling function as a result.

If "Now" is true (is 1) exit will be immediate, otherwise the exit value will be established.

Func Number Primitive

Function#field1number . bad number function)

Execute the function with the assigned function#. Typically this primitive will be used by a user function set to be activated by a Hot Key on the target device labeled "Fn" or "Function" or similar. Such a user function would prompt for a number and then call this primitive (Function#) with that number as a parameter.

See Function Activation.

The "Bad—Number—Function" is a function in the script to be executed if the no function matching the first parameter exists.

This is used to implement number functions—for example clearing memory might be function 1055. The user presses the "Function" hot key, then enters 1055 to execute the function.

To achieve this 1a function containing this primitive should created and set up under function activation to have the appropriate key code.

2A function containing the appropriate action for the numbered function should be created and set up under function activation to have the appropriate function number The function number also returns the logical result of the request to call the numbered function. i.e false if no function exists, otherwise true.

If Else End Primitives

If

The next primitive is executed. If true then all primitives between the if and the else are executed. If false all primitives between the Else and End are executed. If nothing is required between for false then Else may be omitted.

If ! (if with <not?> parameter)

Else

Optional in an If see above.

End

Marks the end of an If or While. See While End

KeyBd Primitive

KeyBd(mode)—(O=off/I=on)

Upon entering idle state, the action of the keyboard is determined by the last KeyBd command. The keyboard (except cancel) will be ignored if off was specified.

MAC Primitive mac(key,mode,message,field)

All targets must support the storing and use of 4 64 bit keys.

mode I

Calculates a mac of the 'message'and stores the value in the 'field' specified. Uses the 'key' specified. If the 'message' is 8 bytes in length only (or less) then a single DES enscription only results.

mode 2

Stores the specified key into secure memory from 'field'.

Mod

Mod(Value,Divisor)

The value "value" id divided by the divisor, and the remainder is the result.

e.g.—the following example would set the Data Field "Remainder" to 4. (25 divided by 7 has a remainder of 4.

Mod(25, 7)

=> Remainder

Pin Primitive pin (field)

Retrieves pin block from pinpad. Not supported on all cardscript devices

Print(Display/Report, Part)

Form

The Display/Report may be selected from the list box—or alternatively by selecting Field->Value[X] taken from a field in the data base.

Part

Values—0=all, 1 pre print/header, 2=body, 3=post print/footer see Forms—end of Header/PrePrintt & Start of Footer/Post Print Action The selected section (or all) of the display is displayed or, in the case of a report, printed.

With displays, any input fields will be accepted, however the Show Primitive is recommended for input operations ProcDown Primitive Procdown(protocol, port)

The specified protocol is started on the port specified. This function is normally used for downstream protocols such as an ECR. This function is intended for more advanced users and the protocol must specify its own success and fail functions.

Protocol Primitive

Prot (protocol, Function 1, Function 2)

The specified protocol is started on the bank corns (upstream) port. The current function execution continues. KeyBd(Off) is set (it may be overridden). If the protocol returns a value of zero, Function 1 will execute, if any other value is return Function 2 will execute. (A KeyBd(on) will automatically happen before either function.

Range Primitive

Range(field,Min,Max)

Returns true if the value specified is >=min and <=max value

Repeat/Until Primitives

Repeat

Repeat sets the execution point for a following until

Until(Case) Cases are 0=False, 1=True

Executes the next primitive and if the result agrees with Case then the Repeats everything after the repeat primitive.

Report (Form, Function)

Action

First prints any pre print or header from "Form". Then for each transaction in the batch calls "Function" and prints the details section of "Form". After cycling throughout the batch, then prints any post print data from "Form".

Form

The Display/Report may be selected from the list box- or alternatively by selecting Field->Value[X] taken from a field in the data base.

Function

A function to be executed before each detail section is printed. For any transaction in the batch for which the function returns FALSE will be skipped.

Restore Primitive

Restore(layout,field,secondary field)

This primitive is used to retrieve information from the Batch Area.

Layout

This optional ("none" is permitted) parameter specifies which transaction layouts are considered for retrieval.

WARNING! All records searched using a field other than RECNUM are actually retrieved, changing the contents of the data fields in their layout. Using a value of "none" may have side effects!

Field

The primary search field. Searching will advance throughout the Batch Area until a match is found.

Secondary Field an optional (Use RECNUM for "none") secondary search field.

Rom Function Primitive

Rom(valuelfield, Message)

Generally the parameter passed is passed directly though to the bios. The following values are assigned for portability % The message parameter is ignored unless otherwise stated.

1Go to ROM mode.

2Erase memory and return to Rom

3Start TIVIS download (from ROM mode).

4Store Rom Params.

Uses Message and returns Success status.

See ROM SETTINGS.

51—oad Rom Params.

Uses Message and returns Success status.

See ROM SETTINGS.

6Activate Rom Edit.

Returns Success status. See ROM SETTINGS see Also

ROM SETTINGS

What are ROM SETTINGS

Sub Heading

Normally target devices store programs in RAM memory, and are capable of loading these programs over the telephone Network. In order to achieve remote loading the device must store telephone number and other details required. The device must have a method of loading and/or editing these details.

Methods vary from device to device with information normally being obtained from the keyboard, a smart or magnetic card or some combination. Obviously the information must be able to be set prior to the application loading.

Communication Between Rom & CardScript

Two possible reasons for CardScript to interact with the ROM Settings arise.

1 The parameters may need to changed in a device already loaded with the CardScript application.

2A CardScript application may need access to the ROM Setting values.

Edit Rom Settings—Rom Function 6.

The desired method of allowing change to the settings is to use this function primitive call.(see Rom Function Primitive.) This primitive may not be supported by all Drivers and (check with the driver provider) but provides the only device independent method of implementing the function. An advantage of this function is the operator sees the same interface as when configuring the terminal prior to loading CardScript.

Load Rom Settings—Rom Function 4.

This function is used to obtain the ROM settings in a Script.

Store Rom Settings—Rom Function 5.

A Script Program may load the Rom Settings with Function 4, allow editing of values and use this function to store the settings. It is recommended to use function 6 (edit) in place of this procedure where available as this mechanism allow changing of device specific settings.

The Rom Communications Buffer.

To provide a much device independence as possible using functions 4 and 5 CardScript defines a standard Communications Buffer Layout with a private area at the end. All Fields are ASCII.

The first three fields are assumed to be used for all communications. 2 bytes connection mode. Lan Leased Line etc 4 bytes station/Lan Address 8 bytes telephone prefix—eg "9," Field 1 16 Bytes Terminal ID. The ID as seen by the software management system and not necessarily other systems.

8 bytes terminal type 24 bytes phone number 24 bytes connection string

Save Primitive

Save(transaction layout)

Saves the current transaction to the batch using the layout specified. A new Transaction Index is generated according to the method specified by the last TxnIdx: Primitive, with the new index stored in field(0,0) RECNUM. For details on RECNUM see Reserved Data Dictionary Settings.

The number of transactions (of the selected layout) which can be stored is returned. If zero is returned, then the save could not work! If 1 (one) is returned then no more may be saved. If two is returned then only one more may be saved, etc.

Store Primitive

Store(offset,messageLayout)

The store primitive stores the last received message, starting at byte <offset>, using the specified message layout. The function result status is set by the operation. (Set to FALSE if the store did not match).

Tots Primitive

Tots(valuer Field)

Selects the relevant totals column.

This primitive has been replaced by the ColSelect primitive. Old programs are automatically upgraded, since parameter 2 or LineTable, when zero, will select the totals table TxnIdx Primitive. Set Transaction Index.

TxnIdx (Field1,Field2,mode)

Field1 is optional. If include the first two digits of the Index are set from this field.

Field2 specifies the main field on which the Index is based. By default this is the ROC field.

the mode specifies how cardscript increments the Txn Idx.

0=add 1

1=Amex Style

2=None. Incremented by script.

This function would normally only ever be used in a start up function. The calculated value is always stored in the ROC field.

User Function Primitive

The user function primitive is used to call any of a range of functions. The functions call by user function are NOT standard.

Primitive—Extensions

It is possible to extend the primitives available to cardscript. The extensions take to form of a block of 'C' code loaded with the Script. 'C' code, of course, has the restriction of being non portable.

The existence of these extensions is to allow extensions to a set of primitives to be tested without changing the core driver. Any extensions initially tested by this means must be added to the set of primitives in a new release, otherwise the code calling them will never be portable.

Wait Primitive wait(minutes, 100 msecs)

The current function pauses for then number of minutes+1 Oaths of seconds specified. A delay of up to 1000 minutes (over sixteen hours is possible) and as small as 1/10 of a second.

While/End Primitives

While(Case) Cases are 0 False, 1=True

The next primitive is executed. If the result matches Case then all primitives between the While and the End are executed, then we come back again to the While. If the result does not match Case then execution continues with the primitive following the End.

End

Marks the end of an If or While. See also —.— If End For specific categories of primitives see Communications Primitives Data Entry Primitives Displaying and Printing For information on configuring CardScript for target device function primitives (advanced users only) see Configure Function Primitives For advanced users only!!

Usage—Name Changes

Changing the name of a primitive or a primitive parameter will cause all scripts using the name change to be automatically updated. Both this type of change and any changes to the "infix" status of a function will have no affect on the driver and scripts will function without further change.

Usage—Adding, Deleting, Changing Parameter Types

Parameter Settings

Each function parameter has the following possible categories

1A Field from the data Dictionary

2Numeric Value—Which may be displayed as an index to a file 3A String

Any parameter may legally accept any combination of categories

Layouts

Cardscript allows you to graphically enter your layout specifications. For details on Receipts, Reports, Displays, Messages, Protocols, and Transactions see Layouts Menu Layouts are the main engine of any application. Although all layouts must bee brought into operation by functions, layouts also in turn launch functions and other layouts.

Form layouts, message layouts, and transaction layouts are similar in operation. All three are an arrangement of fields and strings called a field panel. For details see Field Panels All field Panels (Displays/receipts, messages and transactions) have a Panel Control box in common. The selection in the Panel Control box selects the action to take place when the left mouse button is clicked over the panel.

Additional controls are present of some panels, however, this box always contains An add field—control with field edit box and pallet selector Clicking on the p'a'nel when [add] is selected adds a new field as displayed in the edit box Before—clicking on the edit box to set the field to be added, select the appropriate type of item in the "from pallet" drop down list box Clicking on the edit box brings up either the Select Field Dialog or the Enter String Dialog, in accordance with the pallet selector A dealt field control Select [delete] and then click on the appropriate field A select field Control Select [delete] and then click on the appropriate field Field Editing To edit any field, double click on the field Forms (Displays and Reports)

see also Field Panel, Print Primitive, Show Primitive and Report Primitive

The Screen is Divided into four sections

The Form (Display/Report) Panel

The panel is a Field Panel where the location of the of each field corresponds to the place actual data will appear on the display/printer The Dashed Boundary Depending on the Display/Report type, a dashed line will appear showing the limits of the display or printer. This boundary is drawn in accordance with the settings in the Tables/System menu and can be changed at any time.

Form Name

The display report name is used for reference to this screen and should contain a meaningful name.

Panel Control

In addition to the panel controls discussed in Field Panel, two additional controls are present.—<

<<End of Pre Print

Pre-Print fields appear with a grey background Select this item and click on the field after the end of the header section of the report.

Used in reports, the header section is printed once at the beginning of the report. The sections following the header will be printed once for each transaction in the batch. see Report Function for further details Used in receipts (see Print Function for further details) used to divide the receipt into sections Start of post print Post-Print fields appear with a grey background, and can only be distinguished from Pre-Print fields if there are fields in between. (As would normally be the case.)

Select this item and click on the first field of the post print section of the report.

Used in reports, the Post-Print section is printed once at the end of the report. see Report Function for further details Display/Report Type The types are Display—layout will always appear on the display, and in scribe will have a border reflecting display width and number of lines Secure Display—reserved for future use Printout—layout will always appear on the printer, and in scribe will have a border reflecting printer width Soft Keys The Soft Keys Button allows selection of a soft key set. see Messages Output Messages A messages buffer is built from fields in the data dictionary, and from strings in much the same way a printout is build. However, in messages, all data may be represented in forms other than ASCII. (see "the message engine". Formats may be used to specify data within the selected representation.

Input Messages

Messages are also used to specify how data is transferred from a received buffer and stored in data fields.

see also

The Message Engine (Processor)

The message engine is used both to transfer information both from data fields into a message buffer, and from a message buffer to data fields see also Message Data Mapping Every field in a message buffer is converted from the type in the data field, to the representation of in the message buffer. For "Forms" all data in the buffer is Ascii, but in other messages the data may be any of the following Ascii Ascii Representation Strings and Text Fields Strings & text fields are simply copied. If the source is shorter then the destination, spaces are used for padding Integer Integer to Asch For one & two byte integers, the binary value is converted to its string equivalent and then formatted according to any format specified. Larger integer conversion may appear in a later release Ascii to Integer Again limited to 1 and two byte integers, the value of the text is calculated and stored in the integer.

Amount

As for integer.

Dates

Dates are converted to either DDMMYY or DDMMYYYY if the Ascii field is longer than 7. Formatting is applied on conversion to ASCII only.

Times

Times are converted to either HHMMSS or HHMMSSFF (where FF is the fractions of a.second in hundredths) if the Ascii field is longer than 7. Formatting is applied on conversion to ASCII only.

Hex

Hex Representation

Amounts

To Hex: The data is converted to a BCD string and then expanded

Integers

The binary value is converted directly to Hex. eg a one byte value set to 35decimal (23 hex) would be converted to two bytes—characters' (O×32) and '3' (O×33) representing the hex value 23.

Binary

Binary Representation

Integer

Binary representation of integers is High Byte . . . Low Byte. As a binary value. No Actual conversion takes place Text Binary representation of Text is to assume the text is a hexadecimal string and convert this to binary. To get an exact copy of the string use Text Representation.

BCD

BCD Representation.

The Data is converted to the BCD data type.

Formats

Formats are used for specifying exactly how data will be represented

Justification

Any time the data length is less than the field width, the justification will be used to decide where the data is placed.

Allowed Characters

Specifies the type to characters allowed during input.

Minimum Characters

Specifies the minimum characters allowed for entry to a field.

Maximum Characters

Specifies the maximum characters allowed for data entry, and the maximum displayed characters on output.

Input Window

A non-zero value in this field specifies input will occur within a window. e.g A 24 character text field may be input using a 10 character window because of limited display space. Note that only ten characters of the input would then be visible at any one time.

Input Validation

A function may be specified here to valid input using this format. The validation function may store the current input using the —> (res) primitive. See also the Console Primitive command 4.

Note that an input validation function MUST NOT do any displays, as the current display would be overwritten.

Suppress Leading Zeros

Check here to suppress leading zeros in numeric fields, or leading spaces in text fields Decimal Places Select the appropriate number of places, and the character to use as the decimal indicator. Selecting the decimal (from '.' or ',') also determines the character for thousands separation. (The opposite character to the decimal is used for thousands.

Check the box to require keying of the decimal indicator during input. If this box is left unchecked, data 1.00 (. as decimal) would be input as 100, cash register style.

Auto OK

If this box is checked, when the maximum characters are entered, input will be concluded.

Thousands

The thousands separator(as determined under decimal places) will be automatically inserted.

Password Mode

The first character of the currency symbol will be be displayed in each position, in place of the actual character entered.

Currency Symbol

Specify if the currency symbol is to be displayed. One or two characters may be entered. If the value is two digits, the digits are legal hex digits then these will specify a the character. e.g. 41 would specify the characters', as would a single A character.

This field as has other uses.

The separator for date & time fields is the first character. For time fields the second character is used to separator the hundredths of seconds when displayed Length Indicator In addition to the data, the data length is to be included. The number of digits to use may be 1, 2 or 3. The length may be before (pre) the data or trailing (post). As an alternative to a numeric length specification the currency symbol may be used to indicate the end of a variable length field e.g.

length as 1 —5abcde is a five character field length as 2 —05abcde is the same field currency symbol as ':' and use currency selected abcde: is the same field again Pad BCF with F Check here for BCD fields of odd length to be filled with a trailing F nibble. If unchecked a leading zero nibble would be used.

Transactions

Two other layouts types are also available

Bitmaps

Protocols

Protocols describe message flow both from and to the target device. The top line specifies outgoing messages and the other lines display possible incoming results. A protocol consists of lines and sections.

Request Line

At the start of each section is a line 1 (optional for the first section) which describes the outgoing message. This is the request line.

Response Lines

Lines 2, 3 and above define actions to be taken when a response is received. These are the response lines. A response may be a data received or a time out. When a timeout occurs the first line with a timeout will be selected, any other line with a timeout will never be used. When data is received, all lines beginning with a message are tested to see if received message matches the requirements.

The first item on each response line must be either a message or a timeout.

Protocol Screen Editing

Adding Entries

Select the desired item to add, then click on the display at the desired location Splitting Sections A section may be split on line 1. Click below the line slightly to the left of the field to become part of the second section.

Adding to a Line

When adding fields click on the field that will be after the new field. To add to the end of a line click about 3 spaces beyond the end of the line. Always click on the desired line.

Inserting a line.

Click where the new line should start

Retrys/Skips

After entering a Retry, the retry field will be selected. Or you can select the retry later. Once a retry is selected the <<set retry>> and <<set skip>> commands can be used to set the points where execution should move in the event of either a retry or the retry count being exceeded. Note, retry can only move back and skip can only move forward. For those with color displays, the retry arrow is green and the skip arrow is drawn as red. You can't put a retry/skip on line one.

Identifying Input Messages

The first field of each input line is used to select when the input is appropriate. The following possibilities are catered for Control The input line is selected when the a message begins with the specified character Message The incoming message is matched against the message specified.

Timeout

A timeout line will automatically be selected in response to an incoming timeout.

Function

If the function returns true the message is matched. The Store Function.

Functions Launched By Protocols

Within protocols it is possible to launch functions for various reasons, particularly to store complex messages and select options.

Such functions should NOT halt operation, either by WAIT(or for input or any other event. Should a function attempt to do so, subsequent functions launched from the protocol, including the "good" and "bad" functions, will execute before the function resumes.

Delay any inputs until the good or bad functions at protocol end. If you are an expert user and must do an input, make it the last command in the function and exercise caution.

Repeated Messages

A protocol may involve repeated messages. That is, after storing the data from an input message, another similar message will be received.

Fixed Number of Repeat Messages

If the number of times a message is to be received is fixed then the following approach may be used <Msg><Retry(nn)>

Where nn is then number of messages expected

Variable Number of Repeat Messages

If the number of times the message will be repeated will vary, i.e a flag in the message indicates that a repeat message will follow, then the following technique is recommended.

use an input line with <Function><Retry(O)>

This will cause a loop whilst the function returns true. From the function, use the store primitive to save the data and return true if another message is expected Layout Primitives Layouts use the following elements as building blocks Putting it all together Build Menu Build Target Group Files Builds the font and conf files ready for program execution Build Script as Fragment Builds a reduced script for loading either onto a smart or through the communications network, for describing a particular operation which may be changed without loading a new program.

Build Secure Prompts

Builds the list of secure displays and associated strings for loading into a secure display.

Run Simulation of Build

Activates the terminal simulator program see also

Files Produced By Build

Font Files xxx is the number of the font. Currently always zero fontlxxx.bll

Characters O . . . 127. Bytes are dots across. First byte is top row. If more than 8 dots across, then the next byte continues the dots fontlxxx.bll Characters 128.255, using the same format as theTfile fontdxxx.bll Characters O . . . 128. Bytes are up and down. First dot is top left (bit 0 of byte 1) then dots down the character.

fontuxxx.bll

Script Fragments

Script fragments are small scripts (usually <256 bytes) built separately to a main program. Theses scripts may then be loaded into the terminal (either from a smart card or as part of a message) in order to specify operation of changeable program feature

EXAMPLES OF FRAGMENTS

A Fragment for User Authentication

A Smart Card could contain a program fragment specifying how the terminal should check the user of the card is the real owner. Then cards may be issued with varied scripts such as Input & Check PIN Print A Slip and request a signature Do nothing—no check A Fragment for Communications Protocol A server could have a list of communications protocols or various networks. Then the terminal could dial the server and request the relevant fragment for a particular network (either because the terminal has no information on the network—or the existing protocol no longer functions), allowing the terminal to operate on a new or changed network with obtaining a complete new application.

Menus

File Menu

Configure Menu

The configure menu is greyed on standard level Scribe. The functions available are for the use of advanced users only. Generally within an Organization using CardScript either one master user will be placed in charge of setting configurations or configurations will be set by an external consultant.

The configuration options are

Configure Simulation

Host Comms

Select a comm port for the simulator to use for modem communications. If none are available select "none". Selecting "none" precludes testing comms facilities Terminal Group The Build process creates several build files one for each terminal group. The setting chosen here determines which build file will be used for simulation.

Cards

The simulator does not use a real card reader. Instead it supplies card data from this table. Enter card data as required for up to eight test cards.

To provide the simulator with information on this PC and to create test "Cards".

Configure Targets

A number of target machines may be described to the cardscript system. The information about the target machines is used in various places throughout the scribe system to present information in a manner appropriate to a currently selected "target" machine. see System Record information for setting a Current target.

Object Types

The target machine is described by arranging an number of "objects" on this panel. Their is one of each of the display, printer, and reader objects, and as many button objects as are appropriate.

The display object is used to specify the display configuration in lines and columns. This object should be dragged to an appropriate location in the window.

The printer object is used to specify the print width columns. This object should be dragged to an appropriate location in the window. The number of lines setting bears no relation to the number of lines on a printer page, this field determines how many lines will be available for viewing during simulation.

The reader object is used to describe which area of the window will be used to display buttons for simulation of a card reader. This area bears no relationship th an actual card reader. Drag this object to an otherwise unused area of the window.

Any number of button objects. The object correspond to the push buttons on the target device. Five different button styles are available. Configure these styles as required. When a style is changed, all buttons of that style will change in appearance. Keycodes returned should match those returned by the actual terminal B10S. Use the KeVMap Primitive to force the map these codes to the codes required by the actual application.

For describing the various hardware platforms to the system

For designing Tables Screen Layouts and Contents used on the PC with Scribe

For designing the Data Dictionary used in the Target Device

For Specifying the functions available within the target device.

REFERENCE

Index

Glossary

\#

"–>" (goes to) primitive: <goes to primitive>

"KeyBd": <KeyBd Primitive>

"refer":<ColSelect Primitive>

"target": the PC, EFTPOS terminal, PiNpad or cash register which will be used to run the developed application.

—> (res): <result goes to primitive>

B

Batch Area: Storage area of memory. Used for storing transactions and any other miscellaneous data. Also may be thought of as file storage.

bitnumbering: <Bit Numbering>

C

CardEntryMode: <Card Entry Mode>

ColSelect primitive:

Commands for Memory Cards: <Commands For Memory Cards>

Console Primitive: <Console Primitive>

D

Data Dictionary Field Attributes: <Data Dictionary Field Attributes>

Date & Time Fields: <Dates and Times>

E eserved data dictionary fields:

F

Field Panel: <Field Panels>

Forms —end of Header/PrePrinft & Start of Footer/Post Print:

<Forms>

Function Action: <Function Action>

Function Actions: <Function Actions.>

Function Primitive Categories: <Function Primitive Categories.>

Function Primitives: <Function Primitives>

H

HEX: . Digits 0.9 and A.F

I

Initial Data Field Attributes.: <Initial Data Field Attributes>

K

KeyMap Primitive: <KeyMap Primitive>

P

PFIELD: special field for use on Forms. In place of this field a supplied parameter field will be displayed Print Primitive: <Print Primitive>

PSTRING: special field for use on Forms. In place of this field a supplied parameter string will be displayed.

R

RAD: Application Development (especially used with 'tool')The process of defining a program in a very short time by starting the program definition with the user interface.

Report Primitive: <Report Primitive>

Reserved Data Dictionary Settings:

Reserved Data Dictionary Settings: <Reserved Data Dictionary Settings>

ROM SETTINGS: <ROM SETTINGS>

S

Show Primitive: <Show Primitive>

Smart Card Type Code: <Smart Card Type Codes>

System Table Settings: <System Table Settings>

T

Txnldx Primitive: <Txnldx Primitive>

W

Windows: popular operating system for PCs. based on an event driven architecture.

APPENDIX B

Bios Objectives

The objective of the Cardsoft BIOS is to make all devices used for running Point of Sale software compatible with CardScript programs.

Bios Usage

The Cardsoft BIOS specification is designed to allow the creation of portable programs for Payment Terminals. Any given implementation of the BIOS will encompass its own "look and feel" which, in turn, is imparted to applications using the system. This is possible since the BIOS specifies what must be achieved by low level functions, rather that the manner of achievement, This means that not all implementations of the BIOS are equivalent and there is scope for vastly different performance and operational convenience whilst still maintaining BIOS compatibility. As an example, the BIOS itself does not specify how such things as how cursors and editing functions are implemented, there is simply a call specifying display this field and allow it to be edited. Thus the field editing rules are determined by the individual BIOS implementation. One brand of equipment over type may be standard, on another insert may be the default.

This leaves individual implementers with the ability for creativity and a framework which allows for the performance and convenience of their programmers to be a product advantage.

Also supplied in addition to the core BIOS are some implementation routines. These are supplied in source code as a starting point for actual implementation. However the code in these routines is not applicable to all hardware configurations and would expect over time to be modified in any given implementation.

The BIOS described in this manual represent the interface between Cardsoft EFT applications (including the driver for CardScript) and an EFT terminal, however the specification is general purpose in nature and may in future be used to support other systems. This manual assumes CardScript is to be supported and is geared to assist in achieving this goal. In addition to the functionality described here the EFT device must have its own "bootstrap" system. Where Cardsoft applications are being added to existing products a software module which interfaces between routines described here and the existing driver software can easily be produced. This BIOS specification remains the property of Cardsoft.

Utilising Existing Operating Systems

When first adding CardScript to a device, some level of BIOS or operating system will normally be already in place. In many cases it is desirable to add CardScript to devices originally developed years prior with well tested hardware device drivers. In these instances the BIOS will constitute an interface between the existing operating system and the CardScript driver. The BIOS may then be linked with the Driver and the combined application loaded as one conventional application.

The BIOS is designed to be able to be placed as a layer above any pre-existing operating system, and be loaded together with the Driver program an one application to devices installed in the field.

New Products

In the case of new products, created for use with CardScript, a purpose build BIOS will minimize memory requirements and speed time to market.

Steps To Implementation

The steps in implementing the Cardsoft BIOS are as follows. Check the BIOS library supplied with this manual is correct for your microprocessor development tools. Other versions of this library for other development environments may be obtained from Cardsoft.

Choose appropriate optional code. In order to simplify implementation of the BIOS sample code is supplied for some typical hardware configurations types providing higher level functionality and simplifying installation. It is recommended to make use of this software initially, and replace code as desired once the system is operation on the target hardware. Use supplied outline "main.c" and compile & link.

Add routines to eliminate unresolved externals. Use empty routines supplied for routines to be supplied later. It is recommended to initially include real keyboard and display routines and then add others.

Concepts

Event Driven Structure

Applications constructed to run on the Cardsoft BIOS must be event driven. This allows the BIOS or operating system to have control during idle periods. When an input event occurs, the application is called to process the input, and then returns to the BIOS/operating system. The application sets which routine will handle each message and what messages are enabled.

This event driven structure allows the BIOS to operate as an interface layer to event driven operating systems without problems. Where the underlying structure is not event driven This enables the BIOS functionality to be matched by either low level BIOS code or by a high level operating systems ensuring maximum portability of Cardsoft application, and enabling sophisticated underlying structures to be utilized where present. The event driven structure of the system means that applications do not contain a "main" procedure. Applications have an init-application( routine which sets up a table of routines addresses to be called in the case of external events occurring.

Callbacks

Callback Control—Input

The BIOS must maintain a callback address table with four entries for each input/output file. Associated with each entry in the table is an enable status. When the corresponding event occurs a callback should be made using the address from the table. Each callback contains an optional Code and Message (see below). The BIOS should not issue a second callback while another callback is in progress. This can lead to race conditions.

Output

For porting the Cardsoft Bios to a new machine see

Low Level Interface

The low level interface represents the routines that must be custom written when porting CardScript to a new device. These routines assume that the standard Console module, or equivalent are used. Use of these modules eliminates most of the work in implementing the Cardsoft Bios, but postpones fine tuning the Bios to make use of Specific hardware in the most efficient manner.

Standard Modules

The following modules implement the high level interface console.c callback.c math.c To implement the low level interface, a single module may be created interfacing the foiling routines to the actual hardware or existing drivers. the categories of routine are Low Level Display void dispbin(uchar ch)
Display character ch at current cursor position and advance cursor one place void cleardisplay( )

void dispStr(uchar *str,in len)

continuous dispbin for length of str.

length of str is either len characters, or if len=−1, then str is null terminated.

uchar dispScroll(uchar direction)
Directions are 1 left

2right

3up

4down

Each call is a request to scroll one place in the specified direction. The result indicates the success of the request (1=OK, 0= can't do)

Low Level Printer

The only printer routine is low level. see

Printer void prch(uchar ch)
This routine simply prints the character "ch" on the printer device.

Special codes are as follows

0×A (10) end of line

0×C (12) end of form. Feed I lines as required for tear off of receipt

10 General Routines uchar softKeyBase(uchar select)
By convention returns V for a parameter of 0, and 'a' for a parameter of 1. Change these to indicate actual key values for soft key sets buz void buz(in freq, in duration)

Communications

The following routines must have the code inserted to call the low level drivers correctly.

All routines work with a comfile number. Number 0 is the default and is used for the modem. Number I should be the auxiliary com port, if present. Number 2 is the second auxiliary (again if present) etc.

Sendcom_msg

This routine sends block of characters to the specified port. If low level drivers (such as those used with HDLC) require the block at one time then you will need to call those drivers directly from here. If the target device supports only character mode communications, then the "sendcom" routine may be called once for each character.

void sendcom-msg(in comfile,uchar *buf,in countOfChars)

{

}

Sendcom
   A singe character is transferred to the specified port.

/* individual cons character send routine */
void sendcom(in comfile,in ch)
{
}

Dial
   This routine is used to start the dial process. "num1" is to be dialed "cnt1" times, then if this fails, "num2" is to be dialed "cnt2" times. "Mode" indicates the compunction mode to be used. These parameters are under direct control of the application programmer, but by convention model=async, 2=HDLC

/+MODEM */ void dial(uchar *num1,uchar len1,uchar cnt1 ,uchar *num2, uchar len2,uchar cnt2,uchar mode)
{
}

Hang-up
   The equivalent of the ATH command on a hayes modem.

void hangup( )
{
} txstate( )

uchar txstate( )
   This return should return a status as follows

0=busy

1Ready

2Reserved for errors, no currently used

Real Time Clock
   The real time clock is red & set with the biosDate Time( ) routine biosDateTime( )

unsigned in biosDateTime(command , buffer)

Command (1=read Datetime, 2=set date & time from buffer

Buffer DDMMYYYYHHMMSSFF

TPDU—The smart card interface uchar driveTPDU(uchar 11, uchar 12,uchar *Command, uchar *sendbuf,uchar *receiveBuf)
   This routine implements, both the Scribe TPDU and SmartCard primitives. To decide which is call is being made, the Command parameter must be tested.

Command ==NULL, SmartCard Primitive 11, and 12 are the parameters. Refer Scribe.hlp for details Command!=NULL-TPDU primitive
   This a direct implementation of the scribe TPDU primitive,. with L1 as the length of the sendbuffer, and L2 the length of the receive buffer.
   If L1 is non zero, there is data to send to the card. If L2 is non ZERO, then data from the card is required.

Result
   Return zero, unless the function is used as the SmartCard Primitive, and a result is required.

Timer
   Cardscript requires the target device to have a 100 millisecond timer. This timer should may a call to the script routine "time-tick( )"
   It is recommended not to make a call direct from the hardware timer interrupt. This would result in actions launched by time tick() to execute with interrupts off, giving some very strange results.
   Instead set a flag in the interupt handler and have the event loop clear the flag and call time tick( ) (if using an interrupt handler).
   The script driver includes the routine "start-bomb( )" which may be called by the bios interface if required The Font File
   The font file consists of sets of entries as follows 1 Character code—1 byte 2Width—1 byte 31-length—1 byte 4 Bitmap
   The bitmap is arranged as follows
   For each row of height as many bytes as needed for the bits (1 for width <=8, 2 for width <=16 etc).
   Left most bit in the MSB of the first byte.
   The file is appended with a block of three zero bytes. (Code, width, Height=O) and no bitmap.

For fine tuning an operational Bios see
   BIOS Specification (High Level Interface)
   By Category Routines are:—

Console (Display & Keyboard)

Input

Sequential (Non event driven)
   Since the non event driven machine must be made to appear event driven, the bios interface must include the main line and call the application to handle any events

```
Sample main( )
{
init - hardware( ); /* perform any hardware specific
initialisation */
init - applications( ); /* call to routine in module DRIVE */
for(;;)
  {
    if(event) /* test for event*/
    { clear - event( ); /* clear event status */
      handle-event( )*/ call cardscript event handle - see list*/
    }
    ........
  }
}
```

Events and Handlers
   The following list of events should be catered for

Events List

Console

If the high level console is used. Keyboard events are reduced to a single call Process—

Process-key void process key(uchar key-code)

All that is required by the implementer is to may key codes from the actual machine to the those to be seen by the cardscript application.

Please note that the application programmer has the ability to remap the keys sing cardscript.

Special Key Codes

0×A "Enter" or "OK". (Completion of input)

0×B "Clr" or backspace

0x1B Cancel

The only other console input is the magnetic card reader.

Please use callback(Console, 3,<unused>,buffer,<unused>);

(use 0 (zero) for unused parameters. or process-card (<unused>, buffer)

Magnetic Card Read Buffer

The buffer may include any or all of the following sections. They must appear in order.

Section I (optional)

Identifier byte (001)

Track 1 Data—all ascii values

Track2 (optional)

Identifier byte (002)

Track 2 Data—all ascii values

Track 3 (optional)

Identifier byte (N03)

Track 3 Data—all ascii values

End of data marker

Identifier byte (0x0)

System

System Events

For each event, make a call to the routine void systemEvent(uchar event)

Communications

Comms Events

Character comms callback(Port,1,Character,NULL,O)

Message based comms callback(port,2,0,BufferAddress.MessageLenght)

Dial or Tx Finished

When any operation which made the communications port busy has finished, it should tell the script driver by the following call callback(port,4,0,NULL,0)

see also

Event Driven Input
Please consult Cardsoft for further information

Structural

Memory Management

The MEMPTR type

External Memory
Often target devices have 8 or 16 bit microprocessors which can address limited memory without the use of paging. To allow access to such memory, the concept of External Memory has been defined It is not assumed that this external memory is directly addressable by the CPU, instead this memory is accessed only via the memory management functions.

The script, the data dictionary fields, any optional fonts and the file storage area are all stored in "external" memory. These areas of external memory are allocated numbers as used in the getbase(function, A type MEMPTR is used to address this external memory. In the include file custom.h the type MEMPTR must be defined. If has less than 64k of memory allocated amongst the external memory areas MEMPTR could be defined as unsigned integer. If the memory is larger than this than MEMPTR will normally be defined as "long".

Each block of external memory must APPEAR to be continuous. That is incrementing a MEMPTR with the c++operator must always generate a pointer to the next byte of the area.

The memory management routines must map these virtual memory addresses in to real memory addresses getbase(base)
The function getbase returns the virtual memory address of each of the following blocks of memory 1 The smart card execution buffer 2The Script area—(includes the initialized data dictionary tables 3The Uninitialized data dictionary table area 4The file/batch area getDataByte Returns the byte at the virtual address uchar getDataInt(offset)
Returns the two byte value at the virtual address specified. The format of the two byte value is always Low/High regardless of the byte ordering of the microprocessor.

getScriptData void getScriptData(uchar *bufferMEMPTR offset,in size)

Transfers data from the buffer to the virtual address "offset"

setScriptData void setScriptData(uchar *buffer,OFFSETTYPE offset,in size)
Either set external memory to NULL bytes or to a copy of a buffer buffer is the memory buffer in the standard memory area OR if NULL then the operation is like a memset add notes on offset type size is the number of bytes to store For customizing the cardscript command set set Adding Function Primitives
All function primitives have up to four parameters. Each Parameter is of either one or two bytes length.

Numeric value parameters of values O . . . 127 are one byte in length. Numeric values of greater length and in the general format, with a maximum value of 4999.

All other parameters are in the general format, sixteen bits High order first bit 15 set—numeric value all other 15 bits contain the value high nibble=0x5 next three nibbles give string number.

all other values high byte=table, low byte=field.

REFERENCE

Index

Glossary

"start bomb( )": <start-bomb>

"time-tick( )": in the script-driver for processing ⅒ second time ticks

The invention claimed is:

1. A communications device which is arranged to process messages for communications, comprising a virtual machine means which includes:
 a virtual function processor and function processor instructions for controlling operation of the device, and message instruction means including a set of descriptions of message data;
 a virtual message processor, which is arranged to be called by the function processor and which is arranged to carry out the message handling tasks of assembling the messages, disassembling messages and comparing the messages under the direction of the message instruction means that is arranged to provide directions for operation of the virtual message processor, whereby when a message is required to be handled by the communications device the message processor is called to carry out the message handling task,
 wherein the virtual machine means is emulatable in different computers having incompatible hardwares or operating systems,
 wherein said device is a payment terminal device and wherein said virtual message processor is used to communicate with peripheral units associated with said device.

2. A device in accordance with claim 1 wherein said device is a payment terminal device and wherein said virtual message processor is used to communication with an application associate with said device.

3. A device in accordance with claim 1 wherein said wherein said virtual message processor is used to communicate means associated with the device for implementing cryptographic series.

4. A new device in accordance with claim 1 wherein said device is a personal mobile device.

5. A device in accordance with claim 2 wherein said virtual message processor implements secure communication services.

* * * * *